(12) United States Patent
Park et al.

(10) Patent No.: US 9,444,152 B2
(45) Date of Patent: Sep. 13, 2016

(54) CIRCUIT, APPARATUS AND METHOD FOR ANTENNA MODE STEERING

(71) Applicant: Samsung Electronics Co. Ltd., Suwon-si, Gyeonggi-do (KR)

(72) Inventors: Jung-Min Park, Suwon-si (KR); Min-Goo Kim, Hwaseong-si (KR); Tae-Yoon Kim, Seongnam-si (KR); Chae-Man Lim, Seoul (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 13/956,915

(22) Filed: Aug. 1, 2013

(65) Prior Publication Data

US 2014/0184440 A1    Jul. 3, 2014

(30) Foreign Application Priority Data

Dec. 31, 2012    (KR) ........................ 10-2012-0158449

(51) Int. Cl.
*H01Q 3/12* (2006.01)
*H01Q 3/00* (2006.01)
*H01Q 25/04* (2006.01)
*H01Q 1/12* (2006.01)
*H01Q 1/24* (2006.01)

(52) U.S. Cl.
CPC ............ *H01Q 25/04* (2013.01); *H01Q 1/1257* (2013.01); *H01Q 1/245* (2013.01)

(58) Field of Classification Search
CPC ................. H01Q 3/26; H01Q 3/267
USPC ............. 342/81, 157, 351, 368, 372, 374; 455/67.11, 575.7

See application file for complete search history.

(56) References Cited

U.S. PATENT DOCUMENTS

| | | | |
|---|---|---|---|
| 2001/0022557 A1* | 9/2001 | Rouphael et al. | 342/367 |
| 2002/0183010 A1* | 12/2002 | Catreux et al. | 455/67.1 |
| 2005/0185707 A1 | 8/2005 | Hoo et al. | |
| 2005/0202859 A1* | 9/2005 | Johnson et al. | 455/575.7 |
| 2009/0295648 A1 | 12/2009 | Dorsey et al. | |
| 2010/0144282 A1 | 6/2010 | Laroia et al. | |
| 2010/0222008 A1 | 9/2010 | Astely et al. | |
| 2012/0015603 A1 | 1/2012 | Proctor et al. | |
| 2012/0026906 A1 | 2/2012 | Levin et al. | |
| 2012/0081251 A1 | 4/2012 | Frigon et al. | |
| 2012/0207048 A1 | 8/2012 | Kim | |
| 2014/0162566 A1* | 6/2014 | Desclos et al. | 455/67.13 |
| 2014/0314168 A1* | 10/2014 | Xu et al. | 375/267 |

OTHER PUBLICATIONS

Antonio Forenza and Robert W. Heath, Jr., "Benefit of Pattern Diversity via Two-Element Array of Circular Patch Antennas in Indoor Clustered MIMO Channels", May 2006, vol. 54, No. 5, pp. 943-953.

* cited by examiner

*Primary Examiner* — Dao Phan
(74) *Attorney, Agent, or Firm* — Jefferson IP Law, LLP

(57) ABSTRACT

An Antenna Mode Steering (AMS) method in a signal receiving apparatus using at least one antenna is provided. The method includes measuring a received signal quality of a signal received through the at least one antenna for each of antenna modes available in the signal receiving apparatus, and selecting a specific antenna mode from among the antenna modes as an antenna mode to be used in the signal receiving apparatus based on the measured received signal quality.

60 Claims, 11 Drawing Sheets

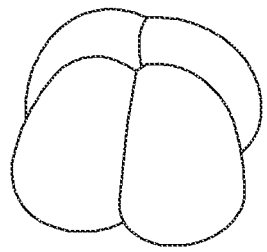
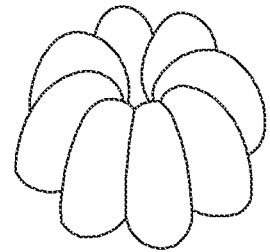
FIG. 1A
(RELATED ART)
FIG. 1B
(RELATED ART)
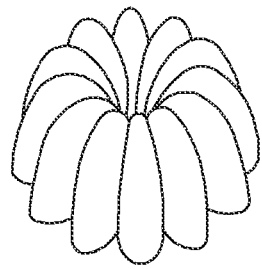
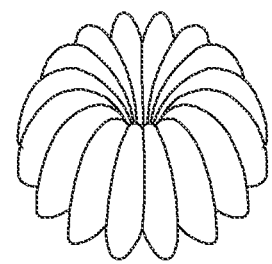
FIG. 1C
(RELATED ART)
FIG. 1D
(RELATED ART)

ANTENNA PATTERN1   ANTENNA PATTERN2   ANTENNA PATTERN3   ANTENNA PATTERN4

CIRCUIT, APPARATUS AND METHOD FOR ANTENNA MODE STEERING

PRIORITY

This application claims the benefit under 35 U.S.C. §119(a) of a Korean patent application filed on Dec. 31, 2012 in the Korean Intellectual Property Office and assigned Serial No. 10-2012-0158449, the entire disclosure of which is hereby incorporated by reference.

BACKGROUND OF THE INVENTION

1. Field of the Invention

The present invention relates to a circuit, apparatus, and method for antenna mode steering in a mobile communication system. More particularly, the present invention relates to an antenna mode steering circuit, apparatus, and method for selecting an antenna mode based on a received signal quality in a mobile communication system.

2. Description of the Related Art

In a radio communication system of the related art, a channel quality measured in a User Equipment (UE) may be important for a radio communication performance, and recently, there is an effort for enhancing a channel quality by suppressing interference from neighbor cells using a null steering scheme for selecting an antenna mode. In a radio communication system, different radiation patterns, which may be applied to a receiving antenna of a UE, may be acquired using Circular Patch Antennas (CPAs).

FIGS. 1A to 1D schematically illustrate a radiation pattern according to an antenna mode if CPAs are used in a Multiple Input Multiple Output (MIMO) system according to the related art.

Referring FIGS. 1A to 1D, in a MIMO system, a radiation pattern corresponding to an antenna mode is designed according to orthogonality of a radiation pattern, which is acquired using CPAs, in order to reduce a correlation among diversity branches. In this case, a diversity order increases as a number of lobes included in the radiation pattern increases, so performance may be enhanced according to an increase of the diversity order. Hence, the CPAs have an enhanced performance compared with a Uniform Linear Array (ULA) in any channel environment, and may be freely implemented compared with the ULA in a channel environment where a size limitation is severe and/or highly important. A performance of the CPAs may be theoretically analyzed using an equation indicating a spatial correlation coefficient of the CPAs, so performance of CPAs, per antenna mode, may be comparatively analyzed. As the performance of CPAs per antenna mode may be comparatively analyzed, a trade-off in a relationship between a spatial diversity and a pattern diversity may be calculated.

In a communication system of the related art, if CPAs are applied to an antenna array, a theoretical channel capacity, according to an antenna mode, may be analyzed. In further detail, an antenna array that is used has merit in any channel environment in view of the performance and the implementation as compared with the ULA that may be used. However, the merit of the antenna mode may be determined without considering a channel quality that is limited even in a case where the antenna array that is used has merit in view of a performance compared with a case where the ULA is used. If the CPAs are used, a beam pattern formed by an antenna has an orthogonal characteristic as shown in FIGS. 1A to 1D. In this case, dynamically changing the patterns may be limited according to a channel quality in view of the pattern diversity.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a circuit, apparatus, and method for antenna mode steering.

Another aspect of the present invention is to provide a circuit, apparatus, and method for antenna mode steering based on channel quality.

Still another aspect of the present invention is to provide a circuit, apparatus, and method for antenna mode steering based on a fading environment.

In accordance with an aspect of the present invention, an Antenna Mode Steering (AMS) method in a signal receiving apparatus using at least one antenna is provided. The AMS method includes measuring a received signal quality of a signal received through the at least one antenna for each of antenna modes available in the signal receiving apparatus, and selecting a specific antenna mode from among the antenna modes as an antenna mode to be used in the signal receiving apparatus based on the measured received signal quality.

In accordance with another aspect of the present invention, an AMS apparatus in a signal receiving apparatus using at least one antenna is provided. The AMS apparatus includes a MOdulator/DE-Modulator (MODEM) configured to measure a received signal quality of a signal received through the at least one antenna for each of antenna modes available in the signal receiving apparatus, and to select a specific antenna mode from among the antenna modes as an antenna mode to be used in the signal receiving apparatus based on the measured received signal quality.

In accordance with further another aspect of the present invention, an AMS circuit in a signal receiving apparatus using at least one antenna is provided. The AMS circuit includes a MODEM configured to measure a received signal quality of a signal received through the at least one antenna for each of antenna modes available in the signal receiving apparatus, and to select a specific antenna mode from among the antenna modes as an antenna mode to be used in the signal receiving apparatus based on the measured received signal quality.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 1A to 1D schematically illustrate a radiation pattern according to an antenna mode if Circular Patch Antennas (CPAs) are used in a Multiple Input Multiple Output (MIMO) system according to the related art;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present exemplary embodiments provide a circuit, apparatus, and method for antenna mode steering. The present exemplary embodiments also provide a circuit, apparatus, and method for antenna mode steering based on channel quality. The present exemplary embodiments further provide a circuit, apparatus, and method for antenna mode steering based on a fading environment. For convenience, it will be assumed that a plurality of antennas is used in the present exemplary embodiments. However, the present invention is not limited thereto, and it will be understood by those of ordinary skill in the art that a circuit, apparatus, and method for antenna mode steering, as shown in the present exemplary embodiments, may be applied to one antenna.

Figure 2:
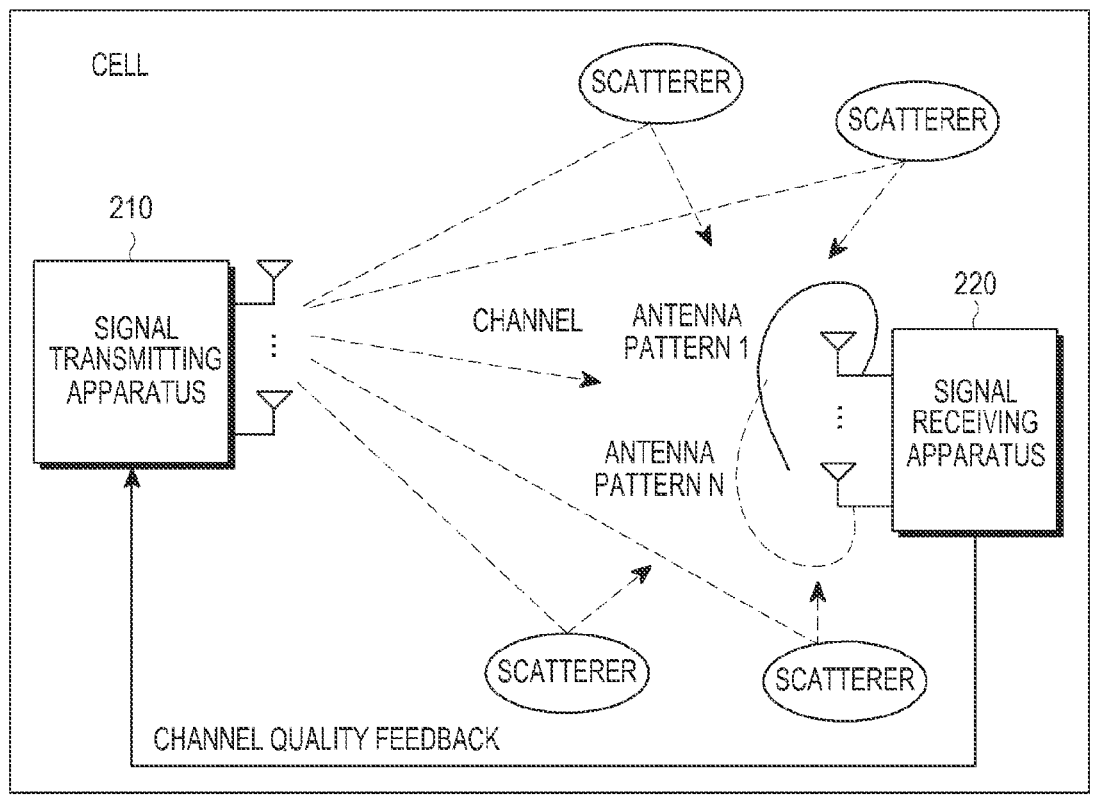
FIG. 2 schematically illustrates a structure of a mobile communication system according to an exemplary embodiment of the present invention.

FIG. 2 schematically illustrates a structure of a mobile communication system according to an exemplary embodiment of the present invention.

Referring FIG. 2, a mobile communication system includes a signal transmitting apparatus 210 and a signal receiving apparatus 220. For example, each of the signal transmitting apparatus 210 and the signal receiving apparatus 220 may be a Base Station (BS), a macro BS, a micro BS, a femto BS, a User Equipment (UE), a repeater, or any other similar and or suitable element of a mobile communication according to a situation.

Upon trying to transmit information to the signal receiving apparatus 220, the signal transmitting apparatus 210 generates a transmission signal by performing a signal transmitting process including a channel encoding operation, a modulation operation, and other similar and/or operations for transmitting a signal, on the information. The signal transmitting apparatus 210 transmits the transmission signal to the signal receiving apparatus 220, and the signal, which is transmitted to the signal receiving apparatus 220, is passed through a channel and received in the signal receiving apparatus 220. The signal receiving apparatus 220 recovers the information by performing a signal receiving process corresponding to the signal transmitting process, i.e., a signal receiving process including a de-modulation operation, a channel decoding operation, and any other similar and/or suitable operations for receiving the signal, on the received signal through the channel.

As shown in FIG. 2, the signal passed through the channel reaches to the signal receiving apparatus 220 as a multipath signal, which is time-delayed through a reflection and a scattering due to scatterers, such as scattering and reflecting objects, which are around or along a signal path between the signal transmitting apparatus 210 and the signal receiving apparatus 220. The channel may be a multipath fading channel, and the multipath fading channel may be an important factor affecting a total throughput of the mobile communication system. If signals which reach to the signal receiving apparatus 220 through a multipath destructively interfere with one another, a status wherein communication is temporarily halted or stopped, i.e., a status such as a deep fading status, may occur in the signal receiving apparatus 220.

Accordingly, various schemes for overcoming a deep fading status may be used in a mobile communication system. In such a mobile communication system, a multiple antenna scheme may be used in order to enhance a transmitting efficiency or reliability, and the multiple antenna scheme may be used in a related-art mobile communication system, such as a Wireless Local Area Network (WLAN) system, a Long Term Evolution (LTE) system, or any other similar and/or suitable mobile communication system. In a case where the multiple antenna scheme is used, the mobile communication system transmits/receives a signal by considering all of a time domain, a frequency domain and a space domain. Accordingly, if the multiple antenna scheme is used, ideally, a channel capacity linearly increases as a number of antennas increases.

As shown in FIG. 2, in a mobile communication system, according to an exemplary embodiment of the present invention, a multiple antenna scheme includes each of the signal transmitting apparatus 210 and the signal receiving apparatus 220 using at least one antenna. In further detail, the signal receiving apparatus 220 uses one of N preset antenna patterns such that a channel quality of a received signal may be different. If the signal receiving apparatus 220 is a BS for example, for an uplink, channel qualities of signals received from all UEs to which the BS provides service may be changed when an antenna pattern is changed. In the present exemplary embodiments, for convenience, it will be assumed that the signal transmitting apparatus 210 is a BS and the signal receiving apparatus 220 is a UE.

The channel quality of the received signal is an important element for determining a performance of a mobile communication system, and various metrics such as a Received Signal Code Power (RSCP), a Reference Signal Received Power (RSRP), a Reference Signal Strength Indicator (RSSI), a Reference Signal Received Quality (RSRQ), a Carrier-to-Interference Noise Ratio (CINR), a Signal-to-Noise Ratio (SNR), a BLock Error Rate (BLER), or any other similar and/or suitable metric, may be used to measure the channel quality of the received signal. In a High Speed Packet Access (HSPA) system and an LTE system of a 3rd Generation Partnership Project (3GPP), an RSCP and an RSRP are respectively used as a metric for measuring a channel quality of a received signal. The RSCP and the RSRP may be significantly changed according to an instant change of a receiving antenna direction, and the detailed description of such a case will be descried below.

A mobile communication system in which Mt transmitting antennas and Mr receiving antennas are used may be modeled as Equation (1) as a relational expression between an input and an output.

$$y=Hx+n \qquad \text{Equation (1)}$$

In Equation (1), x denotes a signal transmitted from a BS, y denotes a signal received in a UE, H denotes a channel transformation matrix, and n denotes an Additive White Gaussian Noise (AWGN). Here, x is an Mt×1 vector, y is an Mr×1 vector, H is an Mr×Mt matrix, and n is an Mr×1 vector. An element located at a position at which an $i^{th}$ row and a $j^{th}$ column of the matrix H are crossed denotes a channel gain from a $j^{th}$ transmitting antenna to an $i^{th}$ receiving antenna. The matrix H, which may also be referred to as a channel transformation matrix H, may be ideally modeled to have independent random variables as all elements, included in the matrix H, which are not correlated one another. However, channel gains of all of the elements may not be completely independent from one another due to a spatial channel characteristic, an antenna characteristic, or other similar and/or suitable characteristics, so the channel gains of all of the elements are partially correlated. For convenience, a channel gain of each of the elements included in the matrix H is referred as a 'separate channel gain'.

A correlation relationship among separate channel gains may result in performance degradation of a multiple antenna scheme, and a detailed description thereof will be provided below.

A channel transformation matrix H may be expressed as a statistics based model, and modeled as Equation (2).

$$\text{vec}(H)=R^{1/2}\text{vec}(H_w) \qquad \text{Equation (2)}$$

In Equation (2), $H_w$ denotes an Mr×Mt MIMO channel, and R denotes an MtMr×MtMr covariance matrix as expressed in Equation (3).

$$R=E[\text{vec}(H)\text{vec}(H)^H] \qquad \text{Equation (3)}$$

In Equation (3), if R is equal to a unit matrix, the channel transformation matrix H becomes equal to Hw.

In the statistics based model, a correlation among the separate channel gains of the channel transformation matrix H may be described in a relatively detailed manner. However, in a view of a complexity of the channel transformation matrix H, the channel transformation matrix H may be expressed using a geometric based model with a relatively lower complexity, and modeled as expressed in Equation (4).

$$H=R_r^{1/2}H_w R_t^{1/2} \qquad \text{Equation (4)}$$

In Equation (4), $R_t$ denotes an Mt×Mt transmission covariance matrix, and $R_r$ denotes an Mr×Mr reception covariance matrix. As shown in Equation (4), the channel transformation matrix H, in the geometric based model form, may occur if angle spectra of signals reached through all transmitting antennas are equal to angle spectra of scatterers in a receiving antenna side, for this, all transmitting antennas should be close to one another and have a same radiation pattern.

If the channel transformation matrix H, in the geometric based model form, is used, a spatial correlation between a BS and a UE may be split, hence the spatial correlation between the BS and the UE may be independently and respectively determined based on a Power Angle Spectrum (PAS) and an antenna pattern gain. For example, if a BS uses two transmitting antennas and a UE uses two receiving antennas, then the Mt×Mt transmission covariance matrix $R_t$ and the Mr×Mr reception covariance matrix $R_r$ may be expressed as Equation (5) and Equation (6), respectively. Here, each of the Mt×Mt transmission covariance matrix $R_t$ and the Mr×Mr reception covariance matrix $R_c$ denotes a correlation matrix.

$$R_t = \begin{bmatrix} 1 & \rho_t \\ \rho_t^* & 1 \end{bmatrix} \quad \text{Equation (5)}$$

$$R_r = \begin{bmatrix} 1 & \rho_r \\ \rho_r^* & 1 \end{bmatrix} \quad \text{Equation (6)}$$

In Equation (5), $\rho_t$ denotes a correlation factor between two transmitting antennas used in the BS. In Equation (6), $\rho r$ denotes a correlation factor between two receiving antennas used in the UE. As described above, since each of $\rho_t$ and $\rho_r$ is determined based on antenna pattern information, such as a PAS, an effect according to a pattern used in the UE may be expressed using the correlation matrix $R_r$.

A geometric based model, such as a Spatial Channel Model (SCM), uses a ray-tracing scheme in order to approximate a multiple path environment of a signal, and a detailed description will be provided below with reference to FIG. 3.

Figure 3:
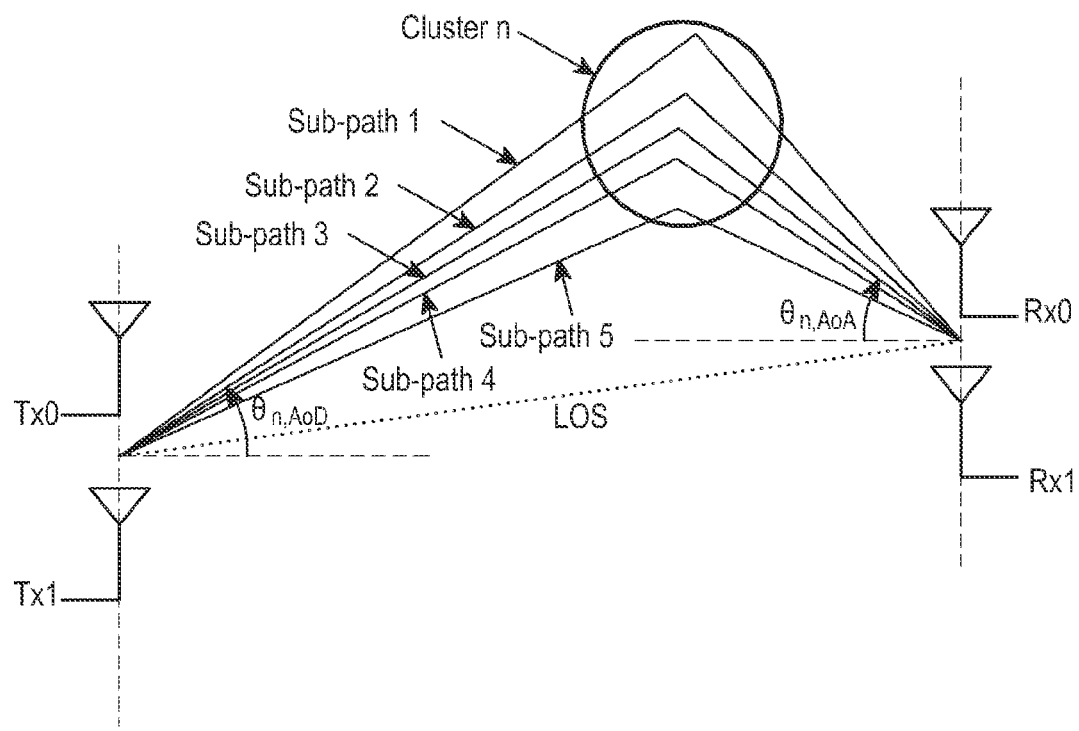
FIG. 3 schematically illustrates a channel transformation matrix H of a geometric based model in a mobile communication system according to an exemplary embodiment of the present invention.

FIG. 3 schematically illustrates a channel transformation matrix H of a geometric based model in a mobile communication system according to an exemplary embodiment of the present invention.

Referring FIG. 3, an approximation of an angular distribution may be expressed using lower paths in order to acquire a power spectrum related to each cluster. Here, it will be assumed that one cluster is a set of scatterers of which each spatial propagation path angle between a BS and a UE is within a preset range. In this case, a time-variant impulse response matrix for an Mr×Mt MIMO channel may as expressed in Equation (7).

$$H(t; \tau) = \sum_{n=1}^{N} H_n(t; \tau) \quad \text{Equation (7)}$$

In Equation (7), t represents time, $\tau$ represents a time delay, N represents the number of clusters, and n represents a cluster index.

A channel gain between a transmitting antenna $n_t$ and a receiving antenna $n_r$ for a cluster n may be as expressed in Equation (8).

$$\begin{aligned} h_{nr,nt,n}(t; \tau) = \\ \sum_{m=1}^{M} \begin{bmatrix} F_{rx,nr,V}(\bar{\theta}_{n,m}) \\ F_{rx,nr,H}(\bar{\theta}_{n,m}) \end{bmatrix}^T \begin{bmatrix} \alpha_{n,m,VV} & \alpha_{n,m,VH} \\ \alpha_{n,m,HV} & \alpha_{n,m,HH} \end{bmatrix} \begin{bmatrix} F_{tx,nt,V}(\bar{\varphi}_{n,m}) \\ F_{tx,nt,H}(\bar{\varphi}_{n,m}) \end{bmatrix} \times \\ \exp(j2\pi\lambda_0^{-1}(\bar{\theta}_{n,m} \cdot \bar{r}_{rx,nr})) \cdot \exp(j2\pi\lambda_0^{-1}(\bar{\varphi}_{n,m} \cdot \bar{r}_{tx,nt})) \times \\ \exp(j2\pi v_{n,m}t)\delta(\tau - \tau_{n,m}) \end{aligned} \quad \text{Equation (8)}$$

Variables in Equation (8) are described in Table 1.

TABLE 1

| variable | description |
|---|---|
| $F_{rx,nr,V}$ and $F_{rx,nr,V}$ | antenna element patterns respectively for vertical and horizontal polarizations |
| $\alpha_{n,m,VV}$ and $\alpha_{n,m,VH}$ | complex gains of vertical-to-vertical and horizontal-to-vertical polarizations of ray (n, m), respectively |
| $\lambda_0$ | wavelength of the carrier frequency |
| $\bar{\theta}_{n,m}$ | Angle of Arrival (AoA) unit vector |
| $\bar{\varphi}_{n,m}$ | Angle of Departure (AoD) unit vector |
| $\bar{r}_{rx,nr}$ and $\bar{r}_{tx,nt}$ | location vectors of element nr and nt, respectively |
| $v_{n,m}$ | Doppler frequency component of ray (n, m) |

In Table 1, $F_{rx,nr,V'}$ represents an antenna element pattern for a vertical polarization, $F_{rx,nr,V'}$ represents an antenna element pattern for a horizontal polarization, $\alpha_{n,m,VV}$ represents a complex gain of a vertical-to-vertical polarization for a ray (n, m), $\alpha_{n,m,VH}$ represents a complex gain of a horizontal-to-vertical polarization for the ray (n, m), $\lambda_0$ represents a wavelength of a carrier frequency, $\bar{\theta}_{n,m}$ represents an Angle of Arrival (AoA) unit vector, $\bar{\varphi}_{n,m}$ represents an Angle of Departure (AoD) unit vector, $\bar{r}_{rx,nr}$ represents a location vector of an element nr, $\bar{r}_{tx,nt}$ represents a location vector of an element nt, and $v_{n,m}$ represents a Doppler frequency component of the ray (n, m).

In the geometric based model, an effect due to an antenna pattern is reflected in gain of paths for each cluster. So, as described above, in the statistics based model or the geometric based model, the channel transformation matrix H changes rapidly according to an antenna pattern change, and accordingly, a channel quality and a performance of a signal received in the UE also changes rapidly. So, for a total performance of a mobile communication system that an antenna pattern used in, receiving antennas should be changed according to a channel quality. If an optimal antenna pattern for the receiving antennas is determined, then the channel quality of the received signal may be accordingly increased.

In an exemplary embodiment of the present invention, as described in FIG. 2, a method for enhancing a channel quality of a signal received in a UE by changing an absorption pattern which is formed around receiving antennas used in the UE based on a preset criterion is proposed.

Figure 4:
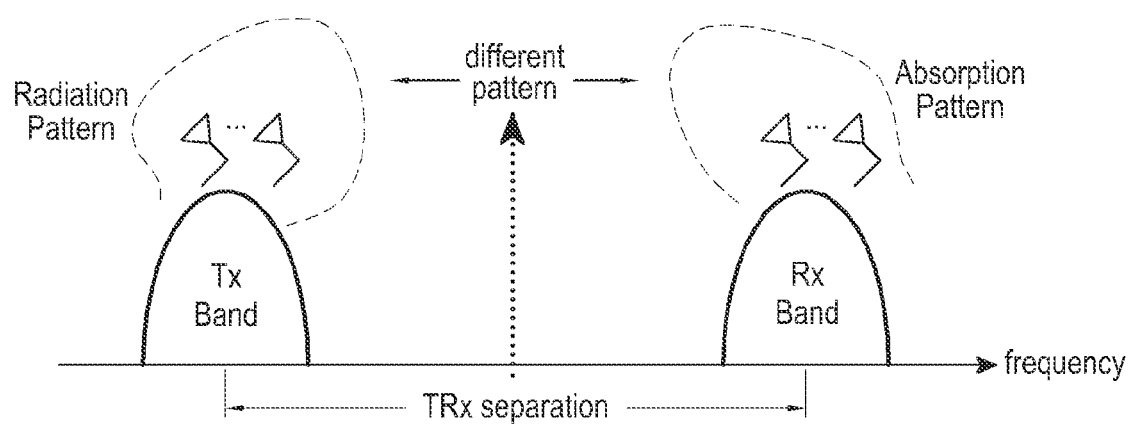
FIG. 4 schematically illustrates characteristics of a radiation pattern and an absorption pattern of an antenna in a mobile communication system according to an exemplary embodiment of the present invention.

FIG. 4 schematically illustrates characteristics of a radiation pattern and an absorption pattern of an antenna in a mobile communication system according to an exemplary embodiment of the present invention.

Referring to FIG. 4, it will be noted that the characteristics of the radiation pattern and the absorption pattern in FIG. 4 are characteristics of a radiation pattern and an absorption pattern of an antenna in a mobile communication system using a Frequency Division Duplexing (FDD) scheme, wherein an absorption pattern is a pattern in which a signal is received according to an antenna pattern used to receive the signal and a radiation pattern is a pattern in which a signal is transmitted according to an antenna pattern used to transmit the signal. Also, a characteristic of a radiation pattern of an antenna and a characteristic of an absorption pattern of the antenna may be similar each other. However, in a mobile communication system where a Transmission (Tx) band and a Reception (Rx) band are completely split, such as in the mobile communication system using the FDD scheme in FIG. 4, the radiation pattern may not be identical to the absorption pattern although the same antenna is used.

Accordingly, in an exemplary embodiment of the present invention, various absorption patterns for a receiving antenna of a UE may be formed by adjusting antenna characteristics, such as a passive radiation characteristic, an active radiation characteristic, an Envelope Correlation Coefficient (ECC), efficiency, and any other similar and/or suitable characteristic of the receiving antenna. In an exemplary embodiment of the present invention, an antenna mode may be dynamically changed using an Antenna Mode Steering (AMS) scheme regardless of a type of the antenna used in forming the absorption pattern.

An absorption pattern formed for a receiving antenna selectively accommodates energy of a received signal in view of space, hence different received signal qualities may occur according to an absorption pattern in the UE unlike in a case having an omni-directional antenna because a PAS of a radio channel may not be equally distributed in view of space. So, the UE may acquire a better received signal quality if an absorption pattern of a receiving antenna is selected so as to be optimal for a current PAS. If a coherence time of a channel is sufficiently longer than a change period of an absorption pattern used in the UE, then an absorption pattern which may have the best received signal quality may be determined by searching for an optimal absorption pattern according to a given instant value of a channel.

In mobile communication systems proposed in a $3^{rd}$ Generation Partnership Project (3GPP) and an Institute of Electrical and Electronics Engineers (IEEE), symbol duration is designed to be mostly equal to the coherence time, which is derived from a maximal Doppler spread. Accordingly, a case where an absorption pattern of a receiving antenna is changed during the symbol duration should be prohibited in order to perform a coherent demodulation operation in a receiver of the UE. For the above described reason, in a fast fading environment, an assumption that the coherence time is sufficiently longer than the absorption pattern of the UE is unrealistic, and it is also unlikely that an absorption pattern which is optimal for a given channel situation is selected. So, in an exemplary embodiment of the present invention, a method for changing an antenna pattern based on a fading environment is proposed, and will be described below with reference to FIGS. 5A to 5B.

Figure 5A:
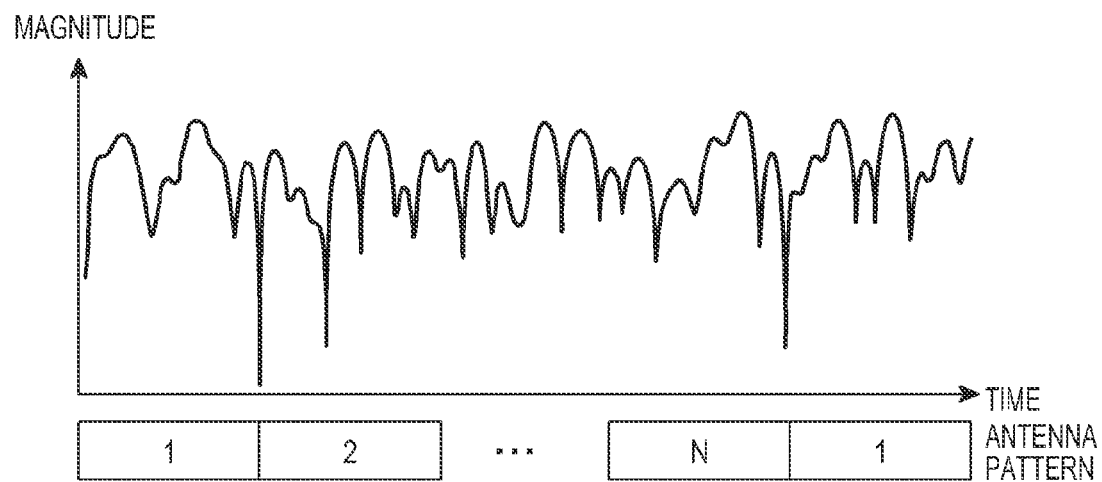
FIGS. 5A to 5B schematically illustrate a method for changing an antenna pattern based on a fading environment in a mobile communication system according to an exemplary embodiment of the present invention.
Figure 5B:
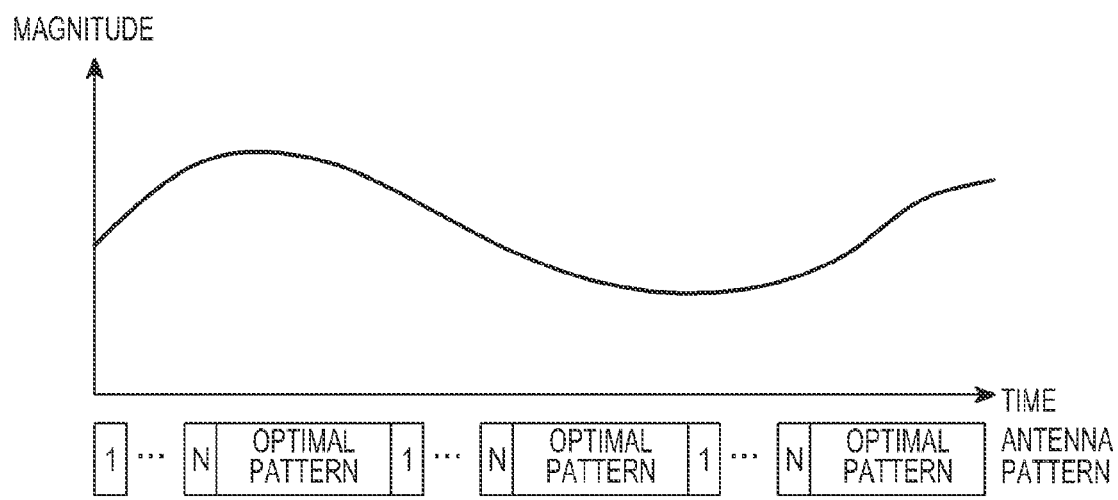

FIGS. 5A to 5B schematically illustrate a method for changing an antenna pattern based on a fading environment in a mobile communication system according to an exemplary embodiment of the present invention.

Referring to FIG. 5A, in a fast fading environment, a channel environment may change quickly, so an average performance is maintained by changing an antenna pattern according to a preset period in a mobile communication system supporting a total of N antenna patterns. Here, a scheme in which the average performance is maintained by changing the antenna pattern according to the preset period is called as a 'sequential selection' scheme.

Referring to FIG. 5B, in a slow fading environment, a channel environment change slowly, so performance increases by searching for an optimal antenna pattern based on a channel environment in a mobile communication system supporting a total of N antenna patterns. Here, a scheme in which the performance increases by searching for the optimal antenna pattern based on the channel environment is called as a 'selective selection' scheme.

Figure 6A:
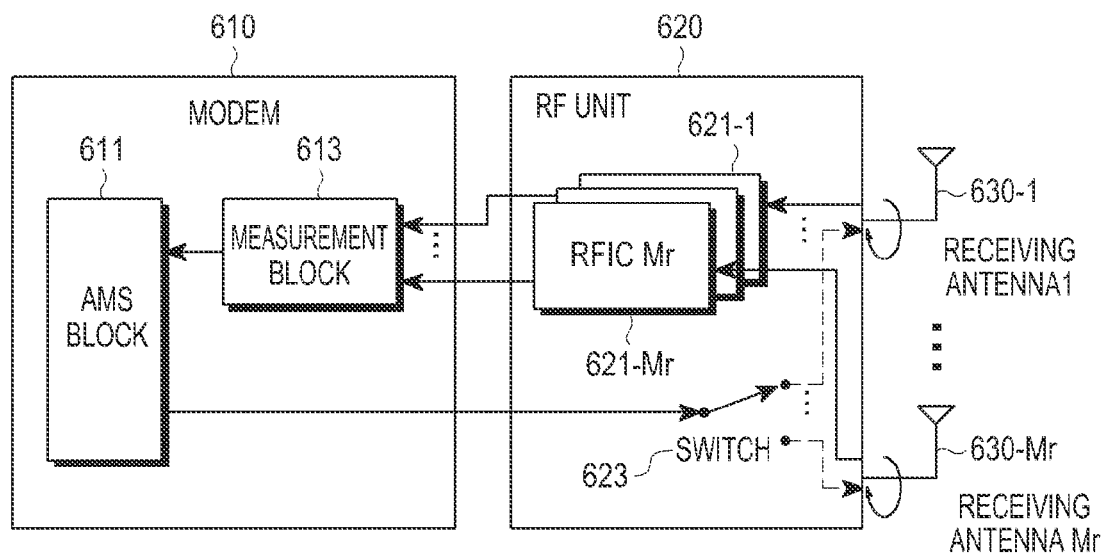
FIG. 6A schematically illustrates an example of an internal structure of a User Equipment (UE) in a mobile communication system according to an exemplary embodiment of the present invention.

FIG. 6A schematically illustrates an example of an internal structure of a UE in a mobile communication system according to an exemplary embodiment of the present invention.

Referring to FIG. 6A, a UE includes a MOdulator/DEModulator (MODEM) 610, a Radio Frequency (RF) unit 620, and Mr receiving antennas 630-1, . . . , 630-Mr. The MODEM 610 includes an AMS block 611 and a measurement block 613, and the RF unit 620 includes Mr Radio Frequency Integrated Circuits (RFICs) 621-1, . . . , 621-Mr and a switch 623.

The RF unit 620 RF processes a signal received through the Mr receiving antennas 630-1, . . . , 630-Mr and outputs the RF processed signal to the measurement block 613. The measurement block 613 measures a quality of the received signal using the signals output from the RFICs 621-1, . . . , 621-Mr. Here, the measurement block 613 measures the quality of the received signal using a metric such as an RSCP, an RSRP, an RSSI, an RSRQ, a CINR, an SNR and a BLER based on a type of the mobile communication system, or any other similar and/or suitable metric, and outputs the result of the received signal quality measurement to the AMS block 611.

The AMS block 611 steers an absorption pattern, i.e., an antenna mode which the Mr receiving antennas 630-1, . . . , 630-Mr will use, using the received signal quality measurement result output from the measurement block 613. Here, the AMS block 611 may steer the absorption pattern based on a preset period or a need. For example, the AMS block 611 may determine that a change to an antenna mode currently used in the UE is needed if the received signal quality output from the measurement block 613 is less than a preset threshold signal quality. On the other hand, the AMS block 611 may determine that maintaining the antenna mode currently used in the UE is needed if the received signal quality output from the measurement block 613 is greater than or equal to the threshold signal quality.

The AMS block 611 controls a connection between the AMS block 611 and the Mr receiving antennas 630-1, . . . , 630-Mr by controlling an operation of the switch 623 based on an antenna pattern which is finally determined according to the steering result. While the MODEM 610 and the RF unit 620 are shown in FIG. 6A as separate units, the present invention is not limited thereto, and it is to be understood that this is for merely convenience of description. In other words, the MODEM 610 and the RF unit 620 may be incorporated into a single unit.

Figure 6B:
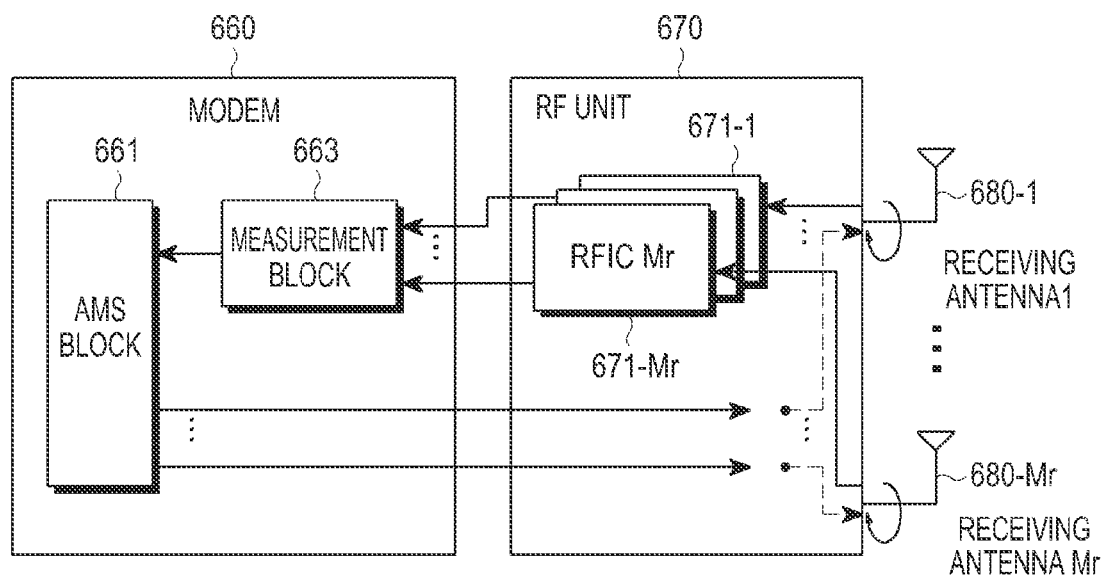
FIG. 6B schematically illustrates another example of an internal structure of a UE in a mobile communication system according to an exemplary embodiment of the present invention.

FIG. 6B schematically illustrates another example of an internal structure of a UE in a mobile communication system according to an exemplary embodiment of the present invention.

Referring to FIG. 6B, a UE includes a MODEM 660, a RF unit 670, and Mr receiving antennas 680-1, . . . , 680-Mr. The MODEM 660 includes an AMS block 661 and a measurement block 663, and the RF unit 670 includes Mr RFICs 671-1, . . . , 671-Mr. The RF unit 670 RF processes a signal received through the Mr receiving antennas 680-1, . . . , 680-Mr and outputs the RF processed signal to the measurement block 663. The measurement block 663 measures a quality of the received signal using the signals output from the RFICs 671-1, . . . , 671-Mr. Here, the measurement block 663 measures the quality of the received signal using a metric such as an RSCP, an RSRP, an RSSI, an RSRQ, a CINR, an SNR, a BLER, or any other similar and/or suitable metric based on a type of the mobile communication system, and outputs the received signal quality measured result to the AMS block 661.

The AMS block 661 steers an absorption pattern, i.e., an antenna mode which the Mr receiving antennas 680-1, . . . , 680-Mr will use, using the received signal quality measured result output from the measurement block 663. Here, the AMS block 661 may steer the absorption pattern based on a preset period or a need. For example, the AMS block 661 may determine that changing an antenna mode currently used in the UE is needed if the received signal quality output from the measurement block 663 is less than a preset threshold signal quality. On the other hand, the AMS block 661 determine that maintaining the antenna mode currently used in the UE is needed if the received signal quality output from the measurement block 663 is greater than or equal to the threshold signal quality.

The AMS block 661 controls a connection between the AMS block 661 and the Mr receiving antennas 680-1, . . . , 680-Mr based on an antenna pattern which is finally determined according to the steering result. While the MODEM 660 and the RF unit 670 are shown in FIG. 6B as separate units, the present invention is not limited thereto, and it is to be understood that this is for merely convenience of description. In other words, the MODEM 660 and the RF unit 670 may be incorporated into a single unit.

Meanwhile, a difference between FIG. 6A and FIG. 6B depends on whether an AMS block changes an antenna mode through a switch or directly changes an antenna mode through a parallel line, such as a respective parallel connection to each of the Mr receiving antennas 680-1, . . . , 680-Mr. In a mobile communication according to an exemplary embodiment of the present invention, a structure of a UE may be implemented as various structures as well as structures shown in FIGS. 6A to 6B. However, although the UE may be implemented as various structures, a closed loop is commonly generated between a RF unit and a MODEM, as shown in FIG. 4.

Figure 7:
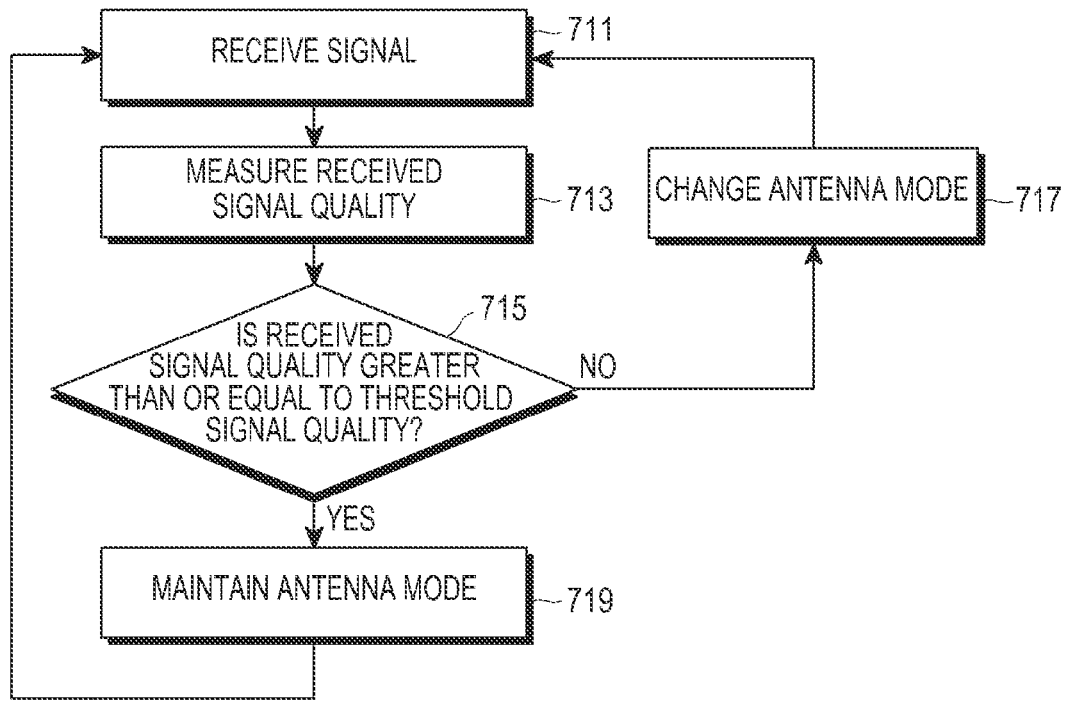
FIG. 7 is a flowchart illustrating an operating process of a UE in a mobile communication system according to an exemplary embodiment of the present invention.

FIG. 7 is a flowchart illustrating an operating process of a UE in a mobile communication system according to an exemplary embodiment of the present invention.

Referring to FIG. 7, a UE receives a signal through receiving antennas in step 711. The UE measures a received signal quality of the received signal, i.e., measures the received signal quality of the received signal using a metric such as a RSCP, a RSRP, a RSSI, a RSRQ, a CINR, an SNR and a BLER, in step 713. The UE then determines whether the received signal quality is greater than or equal to a threshold signal quality in step 715. If the received signal quality is less than the threshold signal quality, then the UE changes an antenna mode currently used in the UE to another suitable antenna mode in step 717 and returns to step 711. On the other hand, if the received signal quality is greater than or equal to the threshold signal quality, as determined in step 715, then the UE determines to maintain the antenna mode currently used in the UE in step 719 and then returns to step 711.

In FIG. 7, the UE immediately changes an antenna mode if the received signal quality is less than threshold signal quality, however the present invention is not limited thereto, and it will be understood by those of ordinary skill in the art that the UE may change the antenna mode after a preset time or any other suitable amount of time without immediately changing the antenna mode by considering a case that the antenna mode change is frequently changed or any other case in which changing the antenna mode should not be changed immediately.

Figure 8:
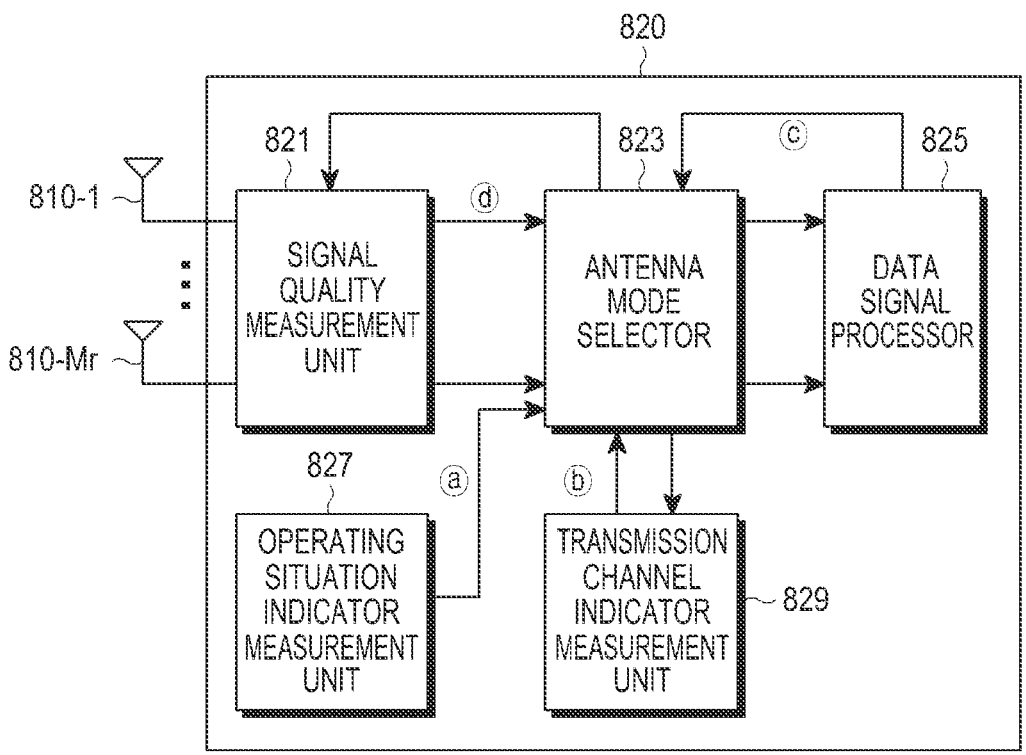
FIG. 8 schematically illustrates another example of an internal structure of a UE in a mobile communication system according to an exemplary embodiment of the present invention.

FIG. 8 schematically illustrates another example of an internal structure of a UE in a mobile communication system according to an exemplary embodiment of the present invention.

Referring to FIG. 8, a UE includes Mr antennas 810-1, . . . , 810-Mr and a MODEM 820. The MODEM 820 includes a signal quality measurement unit 821, an antenna mode selector 823, a data signal processor 825, an operating situation indicator measurement unit 827, and a transmission channel indicator measurement unit 829. The signal quality measurement unit 821 measures a signal quality of a signal received through the Mr antennas 810-1, . . . , 810-Mr. Here, the signal quality measurement is performed using a metric such as a RSCP, a RSRP, a RSSI, a RSRQ, a CINR, an SNR, a BLER, and any other similar and/or suitable metric.

The operating situation indicator measurement unit 827 measures various operating situations using a sensing result measured by a gravitational sensor, a grip sensor, a Universal Serial Bus (USB) connection sensor, a Sub-Miniature version A (SMA) connection sensing included in the UE, or any other similar and/or suitable sensor. The transmission channel indicator measurement unit 829 includes a Doppler estimator, a CINR estimator, and a Channel End (CE) estimator, or any other similar and or suitable estimator, and estimates a current fading situation using an estimated Doppler value, and measures a current channel situation change using the estimated CINR value.

The data signal processor 825 recovers original information, which a BS has transmitted, by processing a signal output from the antenna mode selector 823 based on a preset data processing scheme. The antenna mode selector 823 selects an antenna mode, i.e., an antenna pattern, using a received signal quality output from the signal quality measurement unit 821, an operation situation output from the operating situation indicator measurement unit 827, a channel situation change output from the transmission channel indicator measurement unit 829, and any other similar and/or suitable information, and outputs antenna mode information indicating the selected antenna mode to the signal quality measurement unit 821.

A detailed description of an operation of the antenna mode selector 823 will be described below. As shown in FIG. 8, a signal input to the antenna mode selector 823 is classified with one of signals ⓐ, ⓑ, ⓒ, ⓓ, and each of the signals ⓐ, ⓑ, ⓒ, ⓓ will be described below.

Firstly, the signal ⓐ is a signal output from the operating situation indicator measurement unit 827, and includes a value measured in various sensors included in the UE. The value measured in the various sensors includes information needed for selecting an antenna pattern suitable for a current operating situation of the UE. For example, the antenna mode selector 823 may select an antenna pattern which may maximize a received power, according to a UE's placed position or location, upon using a sensing result of a gravitational sensor included in the UE, or may select an antenna pattern according to whether a user grabs the UE upon using a sensing result of a grip sensor included in the UE.

The detailed description of the signal output from the operating situation indicator measurement unit 827 ⓐ will be provided below. Generally, a UE includes a maximum of 6 sensors for various uses, detects its operating situation using the sensors, and increases its performance using the detected operating situation. However, in an exemplary embodiment of the present invention, the sensors are used for enhancing a received signal quality of the UE. For example, currently, the UE enables a more sensitive reaction for a user's action using an acceleration sensor and a gravitational sensor, so the UE may use the more sensitive reaction for enhancing the user's convenience, e.g., providing a vibration indicating that there are missed calls if the user holds the UE. Generally, a received power in a UE may become different according to a UE's placed position or location or according to whether a user grips the UE.

Accordingly, the received power in the UE may temporarily decrease. As such, in the present exemplary embodiment, a UE senses an operating situation using an acceleration sensor, a gravitational sensor, or any such sensor, in real time and may enhance a received signal quality by detecting an optimal antenna pattern based on the sensed result output from the sensors.

Figure 9:
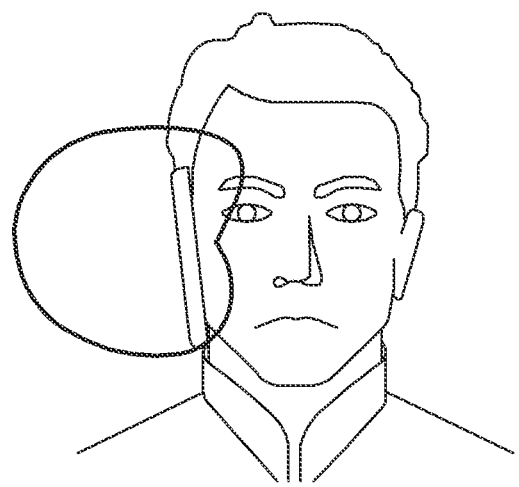
FIG. 9 schematically illustrates an antenna null occurrence according to a call in a UE in a mobile communication system according to an exemplary embodiment of the present invention.

FIG. 9 schematically illustrates an antenna null occurrence according to a call in a UE in a mobile communication system according to an exemplary embodiment of the present invention.

Referring to FIG. 9, the UE may recognize a user's approach using a proximity sensor, and a function in which the UE automatically makes a call to a Short Message Service (SMS) message sender may be provided if the user holds the UE at his/her ear while a screen having the SMS message is displayed on the UE. However, if the user holds the UE at his/her ear in order to make a call, as shown in FIG. 9, an antenna null may occur towards the user's head, wherein the antenna radiation pattern in the direction of the user's head is nulled. In this case, a receiving antenna of the UE may support N antenna patterns, so the UE may compensate a received power decrease due to the antenna null occurrence by selecting an antenna pattern which has a strong received sensitivity in a direction opposite of the direction towards the user's head.

Further, the UE may be used for data transmission, tethering, or any other similar and/or suitable service, such as connecting to an external device, such as a computer, through a USB port or any other similar and/or suitable connector and or port. In this case, the USB connection results in an antenna pattern change, and a received signal quality may become different due to the USB connection or any other similar and/or suitable connection. In the present exemplary embodiments, the UE may enhance a received signal quality by adaptively selecting an antenna pattern.

Secondly, the signal ⓑ is a signal output from the transmission channel indicator measurement unit 829, and is used for selecting an antenna pattern according to a current channel situation of the UE. For example, the antenna mode selector 823 may select an antenna pattern using a sequential selection scheme as described in FIG. 5A or a selective selection scheme as described in FIG. 5B according to the current channel situation. The antenna mode selector 823 compares a CINR output from the transmission channel indicator measurement unit 829 with a preset threshold CINR, and may select an antenna mode according to the compared result. For example, if the CINR output from the transmission channel indicator measurement unit 829 is less than the threshold CINR, a received signal quality may be determined to be bad, and accordingly, the antenna mode selector 823 may select an antenna mode different from a current antenna mode as a new antenna mode. However, the present invention is not limited thereto, and the antenna mode selector 823 may select an antenna mode according to the CINR output from the transmission channel indicator measurement unit 829 being less than, equal to, or greater than the threshold CINR.

Thirdly, the signal ⓒ is a signal output from the data signal processor 825, and includes decoding information quality information such as a BLER and an ACK/NACK. The antenna mode selector 823 may select the antenna mode using the decoding information quality information. For example, if a BLER output from the data signal processor 825 is greater than or equal to a threshold BLER which is preset in the antenna mode selector 823, a received signal quality may be determined to be bad, and accordingly, the antenna mode selector 823 may select an antenna mode different from a current antenna mode as a new antenna mode. For example, if the data signal processor 825 outputs a NACK, a received signal quality is determined to be bad, and accordingly, the antenna mode selector 823 may select an antenna mode different from a current antenna mode as a new antenna mode.

Lastly, a signal ⓓ is a signal output from the signal quality measurement unit 821, and includes a signal quality measured result that is acquired using a metric such as the RSCP, the RSRP, the RSSI, the RSRQ, the CINR, the SNR, and the BLER. Upon determining that a received signal quality is bad using the signal quality measured result, the antenna mode selector 823 may select an antenna mode different from a current antenna mode as a new antenna mode.

In FIG. 8, the antenna mode selector 823 selects an antenna mode by considering each of the signals ⓐ, ⓑ, ⓒ, and ⓓ. However, the present invention is not limited thereto, and it will be understood by those of ordinary skill in the art that the antenna mode selector 823 may select an antenna mode by considering at least two of the signals ⓐ, ⓑ, ⓒ, and ⓓ. Upon selecting an antenna mode by considering at least two of the signals ⓐ, ⓑ, ⓒ, and ⓓ, the antenna mode selector 823 may select an antenna mode by assigning a weight to a specific signal, or may select an antenna mode by assigning the same weight to all signals.

Figure 10A:
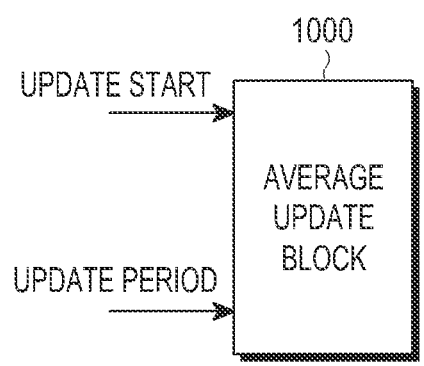
FIG. 10A schematically illustrates an example of an internal structure of an antenna mode selector, such as the antenna mode selector 823 of FIG. 8, according to an exemplary embodiment of the present invention.

FIG. 10A schematically illustrates an example of an internal structure of an antenna mode selector, such as antenna mode selector 823 of FIG. 8, according to an exemplary embodiment of the present invention.

Referring to FIG. 10A, the antenna mode selector 823 includes an average update block 1000. The antenna mode selector 823 maintains a selected antenna pattern regardless of a fading environment of a radio channel during a preset time. The preset time may be set periodically or aperiodically. So, the antenna mode selector 823 determines update start information and update duration information, and then provides the update start information and the update duration information to the average update block 1000.

The average update block 1000 maintains an average performance by changing the antenna pattern based on the update start information and the update duration information. For example, the average update block 1000 may be used if a channel environment relatively rapidly changes, such as in a fast fading environment, and updates an antenna pattern based on a sequential selection scheme described in FIG. 5A.

Figure 10B:
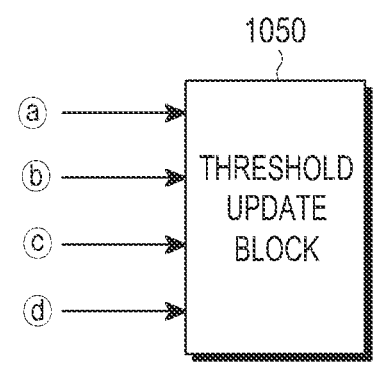
FIG. 10B schematically illustrates another example of an internal structure of an antenna mode selector, such as the antenna mode selector 823 of FIG. 8, according to an exemplary embodiment of the present invention.

FIG. 10B schematically illustrates another example of an internal structure of an antenna mode selector, such as antenna mode selector 823 of FIG. 8, according to an exemplary embodiment of the present invention.

Referring to FIG. 10B, the antenna mode selector 823 includes a threshold update block 1050. The antenna mode selector 823 may select an antenna pattern based on each of the signals ⓐ, ⓑ, ⓒ, and ⓓ, or may select an antenna pattern by considering at least two of the signals ⓐ, ⓑ, ⓒ, and ⓓ. For convenience, a signal used for selecting an antenna pattern is called as an "antenna pattern selecting reference signal", and the antenna pattern selecting reference signal may be any of the signals ⓐ, ⓑ, ⓒ, and ⓓ, or a combination of at least two of the signals ⓐ, ⓑ, ⓒ, and ⓓ.

So, the antenna mode selector 823 provides a threshold value, which corresponds to an antenna pattern selecting reference signal, to the threshold update block 1050, and the threshold update block 1050 compares the antenna pattern selecting reference signal with the threshold value. The threshold update block 1050 selects an antenna pattern based on the comparison result. For example, if the antenna pattern selecting reference signal is greater than or equal to the threshold value, the threshold update block 1050 maintains the antenna pattern. On the other hand, if the antenna pattern selecting reference signal is less than the threshold value, the threshold update block 1050 changes the antenna pattern. For example, the threshold update block 1050 may be used if a channel environment changes relatively slowly like a slow fading environment, and updates an antenna pattern based on a selective selection scheme described in FIG. 5B.

Figure 11:
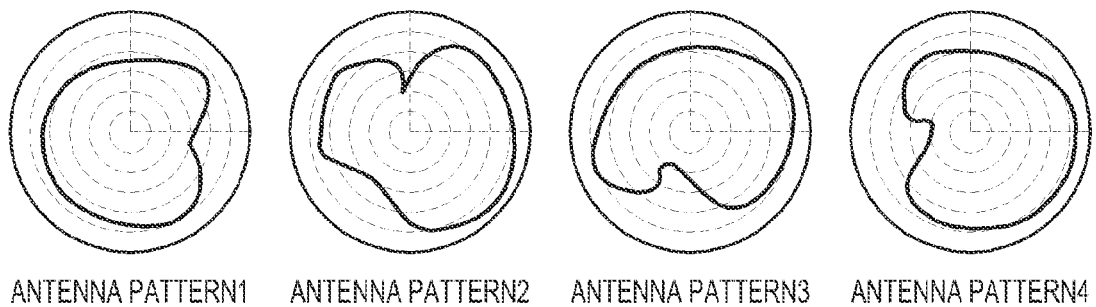
FIG. 11 schematically illustrates an absorption pattern set formed in a reception antenna of a UE according to an exemplary embodiment of the present invention.

FIG. 11 schematically illustrates an absorption pattern set formed in a reception antenna of a UE according to an exemplary embodiment of the present invention.

Referring to FIG. 11, a UE may acquire a desired target received signal quality by periodically changing an absorption pattern or adaptively changing the absorption pattern based on a received signal quality. Here, criterion used for selecting the antenna pattern and an operation of selecting the antenna pattern are described above, so the detailed description thereof will be omitted.

In an exemplary embodiment of the present invention, a period used for changing an antenna pattern is set to a length greater than or equal to a minimum sub-frame length of 1 ms. For example, if the UE selects an antenna pattern by considering a received signal quality, a case wherein the UE should change the antenna pattern within time shorter than the minimum sub-frame length may occur. However, in an exemplary embodiment of the present invention, the UE may apply a new antenna pattern after the minimum sub-frame length from a timing point at which a current antenna pattern is applied without immediately changing the new antenna pattern at a timing point at which the UE has determined the new antenna pattern.

If the antenna pattern is changed within the minimum sub-frame length, then an absorption pattern of a receiving antenna is changed within one sub-frame, and a received signal, within the one sub-frame, may be exchanged with another signal and all processes related to channel estimation, channel measurement, and channel decoding may be affected. So, in an exemplary embodiment of the present invention, the UE should set a time during which the UE applies the antenna pattern by considering the minimum sub-frame length.

Further, if the absorption pattern is quite frequently changed, an effective channel for the UE may be changed after the UE reports channel associated information to a BS. In such a case, a performance for reporting a channel quality may be affected, so, in an exemplary embodiment of the present invention, the UE maintains a set antenna pattern during the minimum sub-frame length for as long as possible. Of course, if an undesirable impact of a particular absorption pattern may be eliminated, then the UE may immediately change the antenna pattern at the time at which the UE determines to change the antenna pattern.

In an exemplary embodiment of the present invention, three AMS schemes, i.e., the first AMS scheme, the second AMS scheme, and the third AMS scheme, are proposed to be used based on a fading environment in order to adaptively select an absorption pattern in a receiving antenna in a UE. In a fast fading environment, where a channel changes severely according to the passage of time, it may not be possible to search for an antenna pattern that is optimal for a channel situation, so a blind searching scheme is applied. Here, the blind searching scheme may be classified with a dynamic adaptation scheme and a semi-static scheme according to a length of the antenna pattern change period. According to the present exemplary embodiment, the dynamic adaptation scheme is the first AMS scheme, i.e., a Dynamic AMS Adaptation scheme, and the semi-static scheme is the second AMS scheme, i.e., a Semi-static AMS Adaptation scheme. In a slow fading environment, a channel realization is maintained for a relatively long time, so a scheme in which the optimal antenna pattern is searched for within a relatively fast time and maintained during a coherence time of a channel is applied, and this scheme may be referred to as the third AMS scheme, i.e., a Selective AMS Adaptation scheme, according to the present exemplary embodiment. However, the present invention is not limited thereto, and any of the first through third AMS schemes may correspond to any of the above described schemes.

Each of the Dynamic AMS Adaptation scheme, the Semi-static AMS Adaptation scheme, and the Selective AMS Adaptation scheme will be described below. Firstly, the Dynamic AMS Adaptation scheme will be described. The Dynamic AMS Adaptation scheme is a scheme in which a UE maintains an optimal performance by adaptively changing an absorption pattern for each of the receiving antennas or changing an absorption pattern for all of the receiving antennas within a relatively short amount of time in an environment where a MODEM included in the UE may not know that a channel situation changes for analyzing a received signal quality of an absorption pattern.

Secondly, the Semi-static AMS Adaptation scheme will be described below. The Semi-static AMS Adaptation scheme is a scheme in which a UE maintains a performance by changing an antenna mode for each of the receiving antennas or changing an antenna mode for all of the receiving antennas at a preset period or aperiodically changing the antenna mode for each of the receiving antennas or changing the antenna mode for all of the receiving antennas in order to acquire and/or maintain a performance average value for a case wherein each antenna pattern is applied in an environment where a MODEM included in the UE may not know or be informed of a change in a channel situation.

The Semi-static AMS Adaptation scheme is a scheme in which a UE selects an absorption pattern from a preset absorption pattern set according to a predetermined order and changes the selected absorption pattern to another absorption pattern after maintaining the selected absorption patter for a preset amount of time. The absorption pattern set includes a plurality of absorption patterns that may be selected from. Upon using the Semi-static AMS Adaptation scheme, an important factor affecting a total performance is that the UE determines a preset time during which a specific absorption pattern is maintained. Additionally, the Semi-static AMS Adaptation scheme will be described below according to whether the preset time has a periodic characteristic.

If the preset time has the periodic characteristic, for example, if the absorption pattern is periodically changed, then a period by which an absorption pattern is changed may be determined based on parameters such as a Doppler estimator, a CE, an RSCP, an RSRP, an RSIP, and an RSRQ as channel environment estimation factors. In this case, the absorption pattern change period should be set longer than a sub-frame length, which becomes a minimum unit of most of performance measurement metrics. On the other hand, if the preset time does not have the periodic characteristic and the performance measurement metrics are measured in real time, then the absorption pattern may be changed to a new absorption pattern using the measured results or a combination of the measured results if a received signal quality is less than a threshold value.

Figure 12:
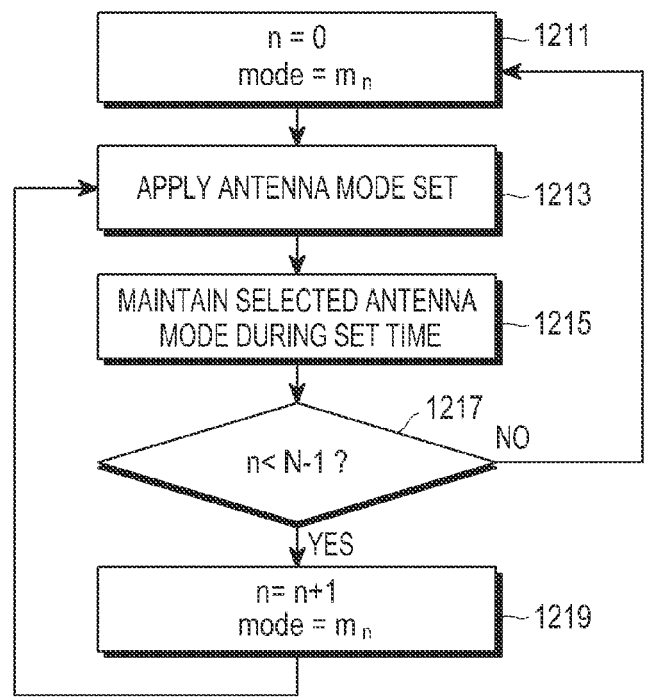
FIG. 12 is a flowchart illustrating a process in which a UE selects an antenna mode using a Semi-static Antenna Mode Steering (AMS) Adaptation scheme which uses a set time having a periodic characteristic according to an exemplary embodiment of the present invention.

FIG. 12 is a flowchart illustrating a process in which a UE selects an antenna mode using a Semi-static AMS Adaptation scheme which uses a set time having a periodic characteristic according to an exemplary embodiment of the present invention.

Referring to FIG. 12, a UE initializes a variable n to '0' and a variable mode to 'mn', in step 1211. The variable n represents an antenna mode index, and has an integer value of one of 0 to N−1. N represents the number of antenna modes supportable in the UE. The variable mode represents an antenna mode currently set in the UE. Next, the UE applies an antenna mode set based on the initial operation in step 1213. The UE maintains the selected antenna mode during a preset time, e.g., for a duration of X sub-frames in step 1215. The UE determines whether a value of the variable n is less than N−1 in step 1217. If the value of the variable n is not less than N−1, then the UE returns to step 1211. Otherwise, if the value of the variable n is less than N−1, then the UE increases the value of the variable n by a preset value, e.g., '1', then sets the value mode to mn in step 1219, and then returns to step 1213.

Figure 13:
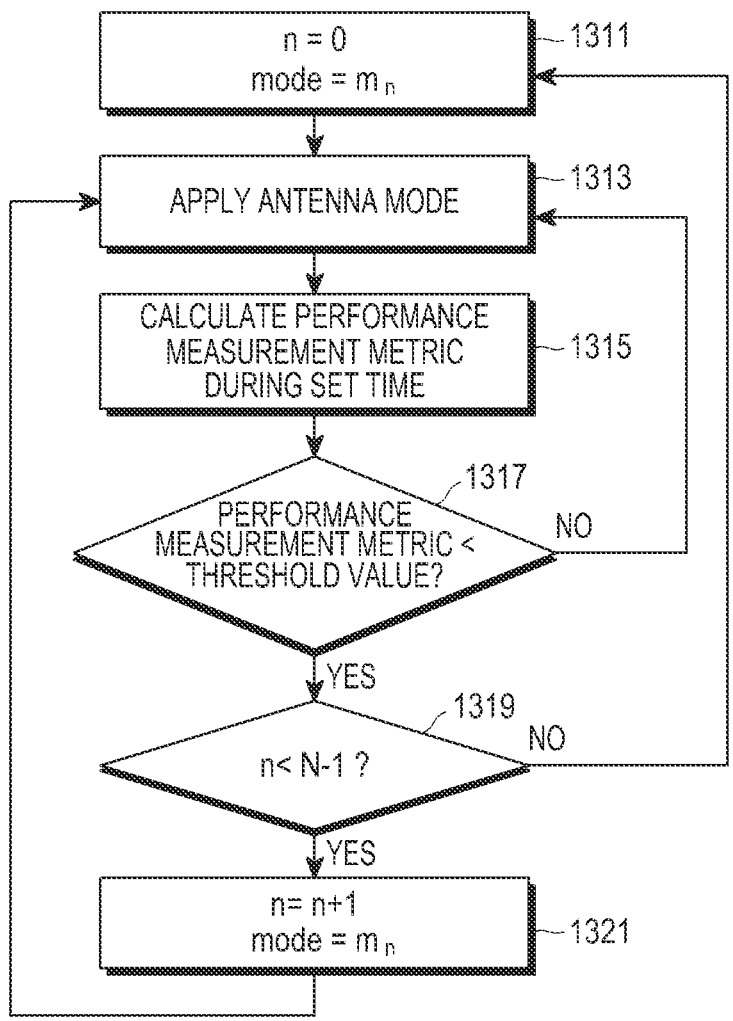
FIG. 13 is a flowchart illustrating a process in which a UE selects an antenna mode using a Semi-static AMS Adaptation scheme which uses a set time having an aperiodic characteristic according to an exemplary embodiment of the present invention.

FIG. 13 is a flowchart illustrating a process in which a UE selects an antenna mode using a Semi-static AMS Adaptation scheme which uses a set time having an aperiodic characteristic according to an exemplary embodiment of the present invention.

Referring to FIG. 13, a UE initializes a variable n to '0' and a variable mode to 'mn' in step 1311. The variable n represents an antenna mode index, and has an integer value of 0 to N−1. N represents the number of antenna modes supportable in the UE. The variable mode represents an antenna mode currently set in the UE. The UE applies an antenna mode set based on the initial operation in step 1313. The UE calculates a preset performance measurement metric for the set antenna mode during a preset time, e.g., for a duration of 1 sub-frame, in step 1315. Net, the UE determines whether the calculated performance measurement metric is less than a preset threshold value in step 1317. If the calculated performance measurement metric is not less than the preset threshold value, then the UE returns to step 1313.

However, if the calculated performance measurement metric is less than the preset threshold value, then the UE determines whether a value of the variable n is less than N−1 in step 1319. If the value of the variable n is not less than N−1, then the UE returns to step 1311. On the other hand, if the value of the variable n is less than N−1, then the UE increases the value of the variable n by a preset value, e.g., '1', then sets the value mode to mn in step 1319, and then returns to step 1313.

Thirdly, the Selective AMS Adaptation scheme will be described below. The Selective AMS Adaptation scheme is a scheme in which a UE selects an antenna mode applied to each of the receiving antennas or selects an antenna mode applied to all of the receiving antennas within a preset time interval in order to acquire an optimal performance which each antenna pattern provides in an environment where the UE may not know that a channel situation is changing.

The detailed description of the Selective AMS Adaptation scheme will be provided below. While maintaining one absorption pattern during one Transmission Time Interval (TTI), the UE measures a received signal quality of the absorption pattern that is maintained. After the TTI, the UE changes the absorption pattern to a new absorption pattern, and measures a received signal quality of the new absorption pattern that is used while maintaining the new absorption pattern during a next TTI. The UE repeats this operation for all absorption patterns supportable in the UE, and then selects an optimal absorption pattern based on a final performance measurement metric, and uses the optimal absorption pattern during a number X TTIs. In order to enhance an efficiency of the Selective AMS Adaptation scheme, the number X should be set as a number greater than the number N, which is a number of absorption patterns supportable in the UE. For this reason, the UE may compensate for performance degradation, which may occur due to a selecting and usage of an absorption pattern that is different from the optimal absorption pattern.

On the other hand, in the Selective AMS Adaptation scheme, if a threshold value is used like the Semi-static AMS Adaptation scheme, then the UE stops a process for calculating performance measurement metrics for remaining absorption patterns upon detecting an absorption pattern having a performance measurement metric greater than the threshold value in a case where the UE tries to search for an optimal absorption pattern. The UE sets the selected absorption pattern as the optimal absorption pattern, and maintains the optimal absorption pattern during X TTIs. Since the process to calculate the performance measurement metrics for the remaining absorption patterns is stopped, a time and a computational load used for searching for the optimal absorption pattern may be decreased.

Figure 14:
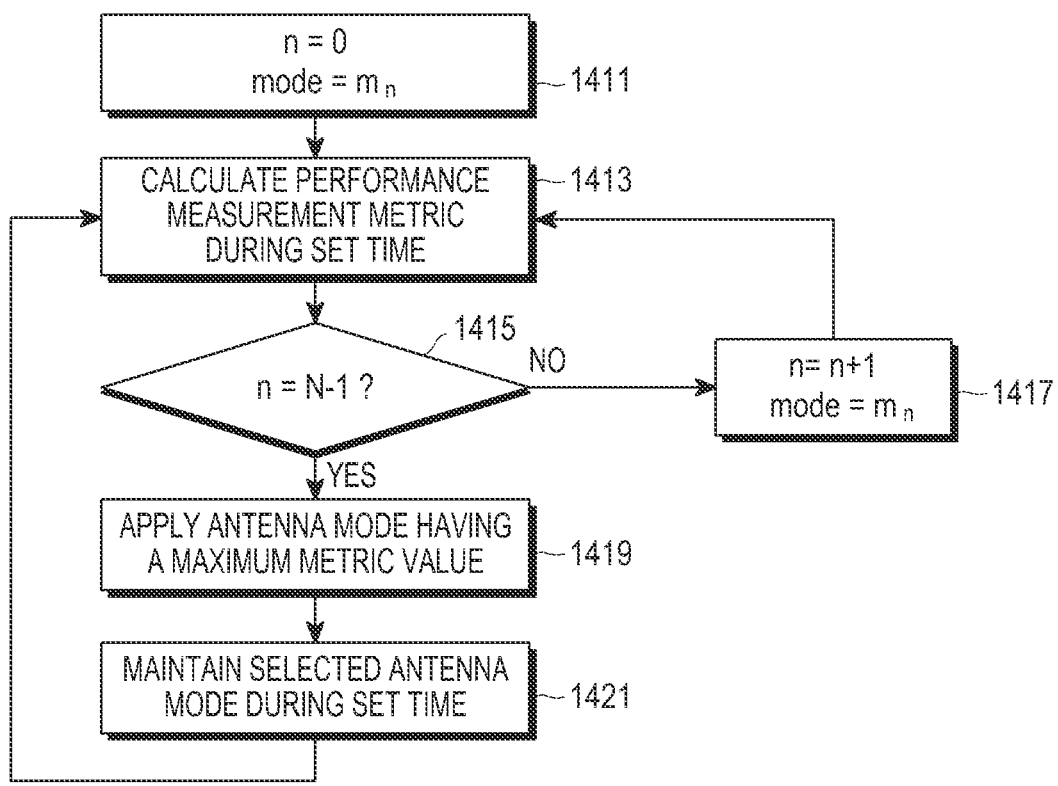
FIG. 14 is a flowchart illustrating a process in which a UE selects an antenna mode using a Selective AMS Adaptation scheme which performs a signal quality measurement operation for all absorption patterns in a mobile communication system according to an exemplary embodiment of the present invention.

FIG. 14 is a flowchart illustrating a process in which a UE selects an antenna mode using a Selective AMS Adaptation scheme which performs a signal quality measurement operation for all absorption patterns in a mobile communication system according to an exemplary embodiment of the present invention.

Referring to FIG. 14, a UE initializes a variable n to '0' and a variable mode to 'mn' in step 1411. The variable n represents an antenna mode index, and has an integer value of 0 to N−1. N represents the number of antenna modes supportable in the UE. The variable mode represents an antenna mode currently set in the UE. The UE calculates a preset performance measurement metric for the set antenna mode during a preset time, e.g., a time duration of 1 sub-frame, in step 1413. Next, the UE determines whether a value of the variable n is less than N−1 in step 1415. If the value of the variable n is not less than N−1, then the UE increases the value of the variable n by a preset value, e.g., '1', then sets the value mode to mn in step 1417, and then returns to step 1413. On the other hand, if the value of the variable n is less than N−1, then the UE applies an antenna mode having a maximum metric value, i.e., an antenna mode in which a maximum metric is detected in step 1419. After step 1419, the UE maintains the selected antenna mode during a preset number of sub-frames, e.g., X sub-frames, in step 1421 and returns to step 1413.

Figure 15:
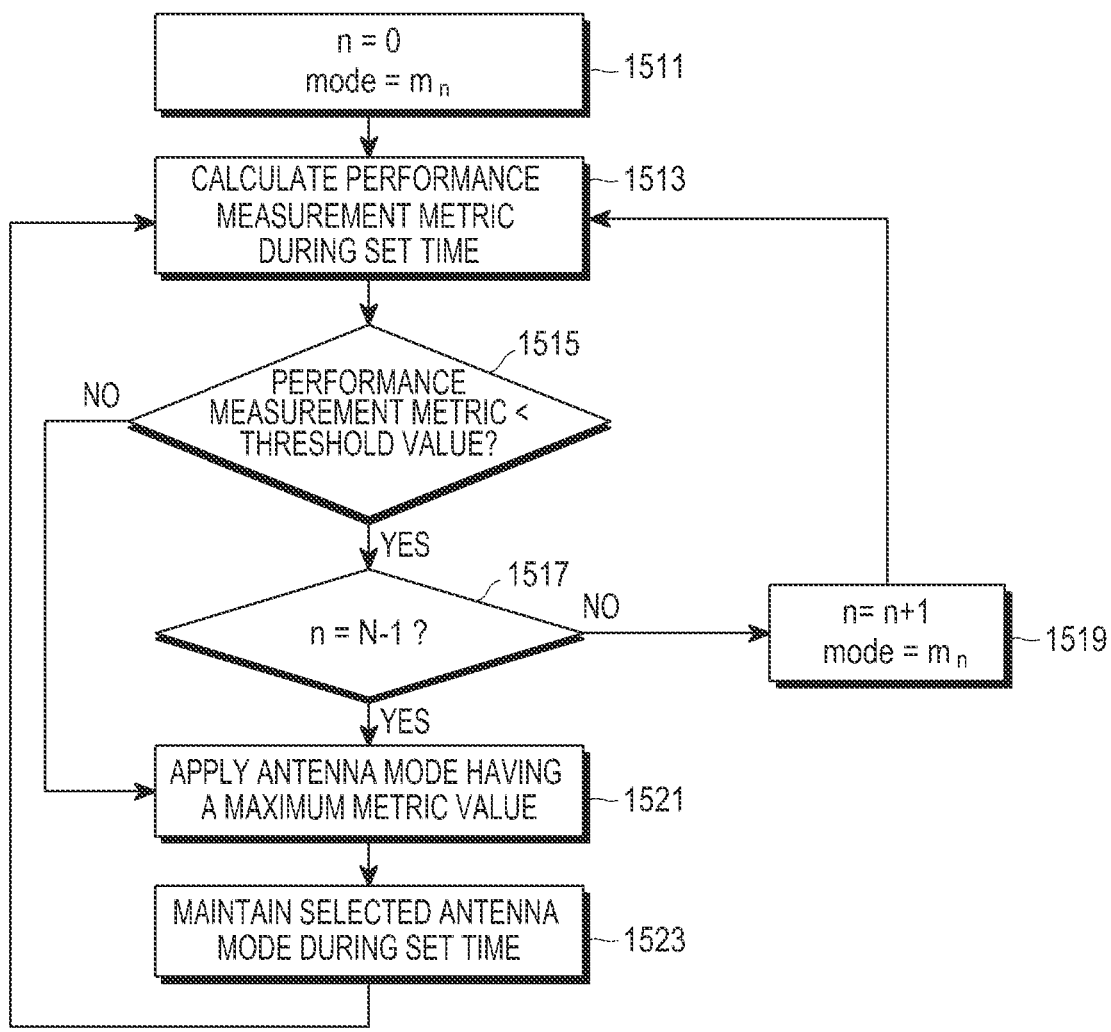
FIG. 15 is a flowchart illustrating a process in which a UE selects an antenna mode using a Selective AMS Adaptation scheme which performs a signal quality measurement operation for all absorption patterns using a threshold value of a performance measurement metric in a mobile communication system according to an exemplary embodiment of the present invention.

FIG. 15 is a flowchart illustrating a process in which a UE selects an antenna mode using a Selective AMS Adaptation scheme which performs a signal quality measurement operation for all absorption patterns using a threshold value of a performance measurement metric in a mobile communication system according to an exemplary embodiment of the present invention.

Referring to FIG. 15, a UE initializes a variable n to '0' and a variable mode to 'mn' in step 1511. The variable n represents an antenna mode index, and has an integer value of 0 to N−1. N represents the number of antenna modes supportable in the UE. The variable mode represents an antenna mode currently set in the UE. The UE calculates a preset performance measurement metric for the set antenna mode during a preset time, e.g., a time duration of 1 sub-frame, in step 1513. Next, the UE determines whether the calculated performance measurement metric is less than a preset threshold value in step 1515. If the calculated performance measurement metric is not less than the preset threshold value, in step 1515, then the UE proceeds to step 1521.

However, if the calculated performance measurement metric is less than the preset threshold value, then the UE determines whether a value of the variable n is less than N−1 in step 1517. If the value of the variable n is not less than N−1, in step 1517, then the UE increases the value of the variable n by a preset value, e.g., '1', then sets the value mode to mn in step 1519, and then returns to step 1513. On the other hand, if the value of the variable n is less than N−1, then the UE applies an antenna mode having a maximum metric value, i.e., an antenna mode in which a maximum metric is detected, in step 1521. After step 1521, the UE maintains the selected antenna mode during a preset time, i.e., during a preset number of sub-frames such as X sub-frames, in step 1523, and then returns to step 1513.

As described in FIG. 15, in a Selective AMS Adaptation scheme, a UE applies a threshold value, and applies an antenna mode selected by applying the threshold value during a preset time, i.e., X TTIs. In this case, it is possible to aperiodically change an antenna mode. As described above, if a threshold value is applied to the Selective AMS Adaptation scheme, a performance may be enhanced by adjusting a period used for detecting an antenna mode and a period used for changing the antenna mode.

The three schemes for adaptively changing an antenna pattern, i.e., the Dynamic AMS Adaptation scheme, the Semi-static AMS Adaptation scheme, and the Selective AMS Adaptation scheme have been described above. On the other hand, it may be difficult to adaptively apply an antenna mode in an environment in which a UE may not know that a channel situation has changed, so the UE may consider parameters in addition to those parameters described above upon using the Semi-static AMS Adaptation scheme. For example, if a channel environment between a BS and a UE changes due to a MIMO scheme, a Space-Frequency Block Code (SFBC) scheme, a beamforming scheme, or any other similar and/or suitable scheme, the UE may consider a method in which the channel environment change is additionally applied to the Semi-static AMS Adaptation scheme.

Further, if a threshold value is used in a Semi-static AMS Adaptation scheme and a Selective AMS Adaptation scheme, a scheme for determining the threshold value may be an important factor for affecting a performance. For example, the threshold value may be set as a fixed threshold value derived from a metric indicating a received signal quality, or may be set as a moving average value of a corresponding metric. In a case where the threshold value is set as the moving average value of the used metric, an antenna pattern may be changed if a received signal quality is greater than or equal to the threshold value, so a situation in which the moving average value continuously increases may occur. In order to prohibit a continuous increase of the moving average value, a mechanism in which the moving average value is decreased if the moving average value is greater than or equal to a preset threshold moving average value may be used.

Meanwhile, a typical UE is equipped with total of two antennas including a main-antenna and a sub-antenna. The main-antenna affects an operation of a closed loop related to a BS, such as a transmission power control. So, in an exemplary embodiment of the present invention, a scheme in which an antenna mode applied to the main-antenna, i.e., a scheme in which an antenna pattern is fixed and an antenna mode applied to the sub-antenna is changed, may be considered. In this case, it is possible that the operation of the closed loop related to the BS is not affected and a performance is enhanced. If the antenna mode applied to the main-antenna is fixed, a scheme in which the antenna mode applied to the sub-antenna becomes optimal using parameters, such as an ECC between the main-antenna and the sub-antenna, may be used.

As is apparent from the foregoing description, an exemplary embodiment of the present invention enables an adaptive antenna mode selection using an AMS scheme in a mobile communication system. Thereby a signal receiving apparatus may select an antenna mode that is optimal for a channel situation even if the signal receiving apparatus does not correctly detect a present channel situation, and hence a performance of the signal receiving apparatus may be enhanced.

An exemplary embodiment of the present invention enables an antenna mode selection optimal for a channel situation mode using an AMS scheme in a mobile communication system, thereby a signal receiving apparatus may enhance a received signal quality, hence a service quality becomes enhanced.

An exemplary embodiment of the present invention enables an adaptive antenna mode selection on which a type of antenna is not limited using an AMS scheme in a mobile communication system, thereby a signal receiving apparatus may adaptively select an antenna mode according to a channel situation regardless of a hardware type of the signal receiving apparatus.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An antenna mode steering (AMS) method in a signal receiving apparatus using at least one antenna, the AMS method comprising:
    measuring a received signal quality of a signal received through the at least one antenna for each of antenna modes available in the signal receiving apparatus based on a fading environment of the signal receiving apparatus and a preset time; and
    selecting a specific antenna mode from among the antenna modes as an antenna mode to be used in the signal receiving apparatus based on the measured received signal quality.

2. The AMS method as claimed in claim 1, wherein the received signal quality includes at least one of an operating situation indicator indicating an operating situation of the signal receiving apparatus, a transmission channel indicator indicating a transmission channel situation of the signal receiving apparatus, decoding information quality information of the signal receiving apparatus, and channel quality information of the signal receiving apparatus.

3. The AMS method as claimed in claim 2, wherein the operating situation indicator includes at least one of sensing values sensed in at least one sensor included in the signal receiving apparatus.

4. The AMS method as claimed in claim 3, wherein the at least one sensor may be at least one of an acceleration sensor, a gravitational sensor, and a proximity sensor.

5. The AMS method as claimed in claim 3, wherein the operating situation indicator includes information indicating whether an external device is connected to the signal receiving apparatus.

6. The AMS method as claimed in claim 2, wherein the transmission channel indicator includes at least one of a doppler value, a carrier-to-interference noise ratio (CINR) value, and a channel end (CE) value.

7. The AMS method as claimed in claim 2, wherein the decoding information quality information includes at least one of a block error rate (BER) and an acknowledgement/negative acknowledgement (ACK/NACK).

8. The AMS method as claimed in claim 2, wherein the received signal quality information includes at least one of a received signal code power (RSCP), a reference signal received power (RSRP), a reference signal strength indicator (RSSI), a carrier-to-interference and noise ratio (CINR), a signal-to-noise ratio (SNR), and a block error rate (BLER).

9. The AMS method as claimed in claim 1, wherein the measuring of the received signal quality of the signal received through the at least one antenna for each of the antenna modes available in the signal receiving apparatus based on the fading environment of the signal receiving apparatus and the preset time comprises at least one of:
   measuring the received signal quality of the signal received through the at least one antenna while changing each of the antenna modes within the preset time for the at least one antenna;
   measuring the received signal quality of the signal received through the at least one antenna while changing each of the antenna modes after maintaining each of the antenna modes during at least the preset time for the at least one antenna; and
   measuring the received signal quality of the signal received through the at least one antenna while changing each of the antenna modes by the preset time for the at least one antenna.

10. The AMS method as claimed in claim 9, wherein the preset time during which each of the antenna modes is maintained for the at least one antenna is longer than a minimal unit of time during which the received signal is measured.

11. The AMS method as claimed in claim 9, wherein the preset time during which each of the antenna modes is maintained for the at least one antenna is a periodic time or a non-periodic time.

12. The AMS method as claimed in claim 11, wherein, if the preset time during which each of the antenna modes is maintained for the at least one antenna is the periodic time, then the received signal quality includes at least one of a transmission channel indicator indicating a transmission channel situation of the signal receiving apparatus as a channel environment estimation factor in which the signal receiving apparatus may estimate a channel estimation of the signal receiving apparatus and channel quality information of the signal receiving apparatus.

13. The AMS method as claimed in claim 12, wherein the transmission channel indicator includes at least one of a doppler value, a carrier-to-interference noise ratio (CINR) value, and a channel end (CE) value.

14. The AMS method as claimed in claim 12, wherein the received signal quality information includes at least one of a received signal code power (RSCP), a reference signal received power (RSRP), a reference signal strength indicator (RSSI), a carrier-to-interference and noise ratio (CINR), a signal-to-noise ratio (SNR), and a block error rate (BLER).

15. The AMS method as claimed in claim 11, wherein, if the preset time during which each of the antenna modes is maintained for the at least one antenna is the non-periodic time, then the preset time during which each of the antenna modes is maintained for the at least one antenna is a time during which the received signal quality of the signal received through the at least one antenna is maintained to be greater than or equal to a preset threshold value.

16. The AMS method as claimed in claim 11, wherein, if the measuring of the received signal quality of the signal received through the at least one antenna for each of the antenna modes available in the signal receiving apparatus based on the fading environment of the signal receiving apparatus comprises measuring the received signal quality of the signal received through the at least one antenna while changing each of the antenna modes by the preset time for the at least one antenna, then the selected antenna mode is maintained during a time longer than a time which is generated by multiplying the preset time by a number of the antenna modes.

17. The AMS method as claimed in claim 1, wherein the at least one antenna includes a sub antenna.

18. The AMS method as claimed in claim 1, further comprising:
   fixing an antenna mode applied to a main antenna from among the at least one antenna.

19. The AMS method as claimed in claim 1, wherein, if the at least one antenna is a main antenna, then the selecting of the specific antenna mode from among the antenna modes as the antenna mode to be used in the signal receiving apparatus based on the measured received signal quality is restrictively performed.

20. The AMS method as claimed in claim 9, wherein, if the measuring the received signal quality of the signal received through the at least one antenna for each of the antenna modes available in the signal receiving apparatus based on the fading environment of the signal receiving apparatus comprises measuring the received signal quality of the signal received through the at least one antenna while changing each of the antenna modes after maintaining each of the antenna modes during at least the preset time for the at least one antenna, then the selected antenna mode is selected based on a channel environment change which occurs if at least one of a multiple input multiple output (MIMO) scheme, a space-frequency block code (SFBC) scheme, and a beam forming scheme is used.

21. An antenna mode steering (AMS) apparatus in a signal receiving apparatus using at least one antenna, the AMS apparatus comprising:
   a modulator/demodulator (MODEM) configured to:
      measure a received signal quality of a signal received through the at least one antenna for each of antenna modes available in the signal receiving apparatus based on a fading environment of the signal receiving apparatus and a preset time, and
      select a specific antenna mode, from among the antenna modes, as an antenna mode to be used in the signal receiving apparatus based on the measured received signal quality.

22. The AMS apparatus as claimed in claim 21, wherein the received signal quality includes at least one of an operating situation indicator indicating an operating situation of the signal receiving apparatus, a transmission channel indicator indicating a transmission channel situation of the signal receiving apparatus, decoding information quality information of the signal receiving apparatus, and channel quality information of the signal receiving apparatus.

23. The AMS apparatus as claimed in claim 22, wherein the operating situation indicator includes at least one of sensing values sensed in at least one sensor included in the signal receiving apparatus.

24. The AMS apparatus as claimed in claim 23, wherein the at least one sensor includes at least one of an acceleration sensor, a gravitational sensor, and a proximity sensor.

25. The AMS apparatus as claimed in claim 23, wherein the operating situation indicator includes information indicating whether an external device is connected to the signal receiving apparatus.

26. The AMS apparatus as claimed in claim 22, wherein the transmission channel indicator includes at least one of a doppler value, a carrier-to-interference noise ratio (CINR) value, and a channel end (CE) value.

27. The AMS apparatus as claimed in claim 22, wherein the decoding information quality information includes at least one of a block error rate (BER) and an acknowledgement/negative acknowledgement (ACK/NACK).

28. The AMS apparatus as claimed in claim 22, wherein the received signal quality information includes at least one of a received signal code power (RSCP), a reference signal received power (RSRP), a reference signal strength indicator (RSSI), a carrier-to-interference and noise ratio (CINR), a signal-to-noise ratio (SNR), and a block error rate (BLER).

29. The AMS apparatus as claimed in claim 21, wherein the MODEM is further configured to at least one of:
measure the received signal quality of the signal received through the at least one antenna while changing each of the antenna modes within the preset time for the at least one antenna,
measure the received signal quality of the signal received through the at least one antenna while changing each of the antenna modes after maintaining each of the antenna modes during at least the preset time for the at least one antenna, and
measure the received signal quality of the signal received through the at least one antenna while changing each of the antenna modes by the preset time for the at least one antenna.

30. The AMS apparatus as claimed in claim 29, wherein the preset time during which each of the antenna modes is maintained for the at least one antenna is longer than a minimal unit of time during which the received signal is measured.

31. The AMS apparatus as claimed in claim 29, wherein the preset time during which each of the antenna modes is maintained for the at least one antenna is a periodic time or a non-periodic time.

32. The AMS apparatus as claimed in claim 31, wherein, if the preset time during which each of the antenna modes is maintained for the at least one antenna is the periodic time, then the received signal quality includes at least one of a transmission channel indicator indicating a transmission channel situation of the signal receiving apparatus as a channel environment estimation factor in which the signal receiving apparatus may estimate a channel estimation of the signal receiving apparatus and channel quality information of the signal receiving apparatus.

33. The AMS apparatus as claimed in claim 32, wherein the transmission channel indicator includes at least one of a doppler value, a carrier-to-interference noise ratio (CINR) value, and a channel end (CE) value.

34. The AMS apparatus as claimed in claim 32, wherein the received signal quality information includes at least one of a received signal code power (RSCP), a reference signal received power (RSRP), a reference signal strength indicator (RSSI), a carrier-to-interference and noise ratio (CINR), a signal-to-noise ratio (SNR), and a block error rate (BLER).

35. The AMS apparatus as claimed in claim 31, wherein, if the preset time during which each of the antenna modes is maintained for the at least one antenna is the non-periodic time, then the preset time during which each of the antenna modes is maintained for the at least one antenna is a time during which the received signal quality of the signal received through the at least one antenna is maintained to be greater than or equal to a preset threshold value.

36. The AMS apparatus as claimed in claim 31, wherein, if the MODEM measures the received signal quality of the signal received through the at least one antenna as changing each of the antenna modes by the preset time for the at least one antenna, the MODEM is further configured to maintain the selected antenna mode during a time longer than a time which is generated by multiplying the preset time by a number of the antenna modes.

37. The AMS apparatus as claimed in claim 21, wherein the at least one antenna includes a sub antenna.

38. The AMS apparatus as claimed in claim 21, wherein the MODEM is further configured to fix an antenna mode applied to a main antenna from among the at least one antenna.

39. The AMS apparatus as claimed in claim 21, wherein, if the at least one antenna is a main antenna, then the MODEM is further configured to restrictively perform the operation of selecting the specific antenna mode from among the antenna modes as the antenna mode to be used in the signal receiving apparatus based on the measured received signal quality.

40. The AMS apparatus as claimed in claim 29, wherein, if the MODEM measures the received signal quality of the signal received through the at least one antenna while changing each of the antenna modes after at least maintaining each of the antenna modes during the preset time for the at least one antenna, the MODEM is further configured to select the antenna mode by considering a channel environment change which occurs if at least one of a multiple input multiple output (MIMO) scheme, a space-frequency block code (SFBC) scheme, and a beam forming scheme is used.

41. An antenna mode steering (AMS) circuit in a signal receiving apparatus using at least one antenna, the AMS circuit comprising:
a modulator/demodulator (MODEM) configured to:
measure a received signal quality of a signal received through the at least one antenna for each of antenna modes available in the signal receiving apparatus based on a fading environment of the signal receiving apparatus and a preset time, and
select a specific antenna mode from among the antenna modes as an antenna mode to be used in the signal receiving apparatus based on the measured received signal quality.

42. The AMS circuit as claimed in claim 41, wherein the received signal quality includes at least one of an operating situation indicator indicating an operating situation of the signal receiving apparatus, a transmission channel indicator indicating a transmission channel situation of the signal receiving apparatus, decoding information quality information of the signal receiving apparatus, and channel quality information of the signal receiving apparatus.

43. The AMS circuit as claimed in claim 42, wherein the operating situation indicator includes at least one of sensing values sensed in at least one sensor included in the signal receiving apparatus.

44. The AMS circuit as claimed in claim 43, wherein the at least one sensor may be at least one of an acceleration sensor, a gravitational sensor, and a proximity sensor.

45. The AMS circuit as claimed in claim 43, wherein the operating situation indicator includes information indicating whether an external device is connected to the signal receiving apparatus.

46. The AMS circuit as claimed in claim 42, wherein the transmission channel indicator includes at least one of a doppler value, a carrier-to-interference noise ratio (CINR) value, and a channel end (CE) value.

47. The AMS circuit as claimed in claim 42, wherein the decoding information quality information includes at least one of a block error rate (BER) and an acknowledgement/negative acknowledgement (ACK/NACK).

48. The AMS circuit as claimed in claim 42, wherein the received signal quality information includes at least one of a received signal code power (RSCP), a reference signal received power (RSRP), a reference signal strength indicator (RSSI), a carrier-to-interference and noise ratio (CINR), a signal-to-noise ratio (SNR), and a block error rate (BLER).

49. The AMS circuit as claimed in claim 41, wherein the MODEM is further configured to at least one of:
measure the received signal quality of the signal received through the at least one antenna while changing each of the antenna modes within the preset time for the at least one antenna,
measure the received signal quality of the signal received through the at least one antenna while changing each of the antenna modes after maintaining each of the antenna modes during at least the preset time for the at least one antenna, and
measure the received signal quality of the signal received through the at least one antenna while changing each of the antenna modes by the preset time for the at least one antenna.

50. The AMS circuit as claimed in claim 49, wherein the preset time during which each of the antenna modes is maintained for the at least one antenna is longer than a minimal unit of time during which the received signal is measured.

51. The AMS circuit as claimed in claim 49, wherein the preset time during which each of the antenna modes is maintained for the at least one antenna is the periodic time or the non-periodic time.

52. The AMS circuit as claimed in claim 51, wherein, if the preset time during which each of the antenna modes is maintained for the at least one antenna is the periodic time, then the received signal quality includes at least one of a transmission channel indicator indicating a transmission channel situation of the signal receiving apparatus as a channel environment estimation factor in which the signal receiving apparatus may estimate a channel estimation of the signal receiving apparatus and channel quality information of the signal receiving apparatus.

53. The AMS circuit as claimed in claim 52, wherein the transmission channel indicator includes at least one of a doppler value, a carrier-to-interference noise ratio (CINR) value, and a channel end (CE) value.

54. The AMS circuit as claimed in claim 52, wherein the received signal quality information includes at least one of a received signal code power (RSCP), a reference signal received power (RSRP), a reference signal strength indicator (RSSI), a carrier-to-interference and noise ratio (CINR), a signal-to-noise ratio (SNR), and a block error rate (BLER).

55. The AMS circuit as claimed in claim 51, wherein, if the preset time during which each of the antenna modes is maintained for the at least one antenna is the non-periodic time, then the preset time during which each of the antenna modes is maintained for the at least one antenna is a time during which the received signal quality of the signal received through the at least one antenna is maintained to be greater than or equal to a preset threshold value.

56. The AMS circuit as claimed in claim 51, wherein, if the MODEM measures the received signal quality of the signal received through the at least one antenna as changing each of the antenna modes by the preset time for the at least one antenna, the MODEM is further configured to maintain the selected antenna mode during a time longer than a time which is generated by multiplying the preset time by a number of the antenna modes.

57. The AMS circuit as claimed in claim 41, wherein the at least one antenna includes a sub antenna.

58. The AMS circuit as claimed in claim 41, wherein the MODEM is further configured to fix an antenna mode applied to a main antenna from among the at least one antenna.

59. The AMS circuit as claimed in claim 41, wherein, if the at least one antenna is a main antenna, then the MODEM restrictively is further configured to perform the operation of selecting the specific antenna mode from among the antenna modes as the antenna mode to be used in the signal receiving apparatus based on the measured received signal quality.

60. The AMS circuit as claimed in claim 49, wherein, if the MODEM measures the received signal quality of the signal received through the at least one antenna while changing each of the antenna modes after at least maintaining each of the antenna modes during the preset time for the at least one antenna, the MODEM is further configured to select the antenna mode by considering a channel environment change which occurs if at least one of a multiple input multiple output (MIMO) scheme, a space-frequency block code (SFBC) scheme, and a beam forming scheme is used.

* * * * *